(12) United States Patent
Tahara et al.

(10) Patent No.: US 6,529,550 B2
(45) Date of Patent: *Mar. 4, 2003

(54) CODED STREAM SPLICING DEVICE AND METHOD, AND CODED STREAM GENERATING DEVICE AND METHOD

(75) Inventors: Katsumi Tahara, Kanagawa (JP); Mikita Yasuda, Kanagawa (JP); Shinji Negishi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,771

(22) Filed: Jun. 1, 1999

(65) Prior Publication Data

US 2002/0080875 A1 Jun. 27, 2002

Related U.S. Application Data

(63) Continuation of application No. PCT/JP98/04497, filed on Oct. 5, 1998.

(30) Foreign Application Priority Data

Oct. 3, 1997 (JP) ............................................. 9-271275

(51) Int. Cl.[7] ............................................. H04B 1/66
(52) U.S. Cl. ...................... 375/240; 370/474; 370/487; 370/498; 370/345; 370/527; 370/394
(58) Field of Search ................................. 348/240, 473, 348/845, 705, 423, 439, 526, 441, 911; 375/240; 370/474, 487, 498, 345, 527, 394

(56) References Cited

U.S. PATENT DOCUMENTS

| | | | | |
|---|---|---|---|---|
| 5,917,830 A | * | 6/1999 | Chen et al. | 348/473 |
| 6,038,000 A | * | 3/2000 | Hurst, Jr. | 348/845 |
| 6,067,303 A | * | 5/2000 | Aaker et al. | 370/474 |
| 6,118,491 A | * | 9/2000 | Wu et al. | 348/526 |

* cited by examiner

*Primary Examiner*—Chris Kelley
*Assistant Examiner*—Shawn S. An
(74) *Attorney, Agent, or Firm*—Frommer Lawrence & Haug LLP; William S. Frommer; Bruno Polito

(57) ABSTRACT

A system for seamlessly splicing two encoded video streams. In one implementation of the system, one or more coding parameters are extracted from the first and/or second encoded streams and one or more parameters of the first and/or second encoded streams are changed in accordance with the extracted parameter(s) in order to effectuate seamless splicing. In another implementation, the coding parameters applied to the first encoded stream are referenced when encoding the second stream such that the resulting second encoded stream can be seamlessly spliced with the first encoded stream.

32 Claims, 20 Drawing Sheets

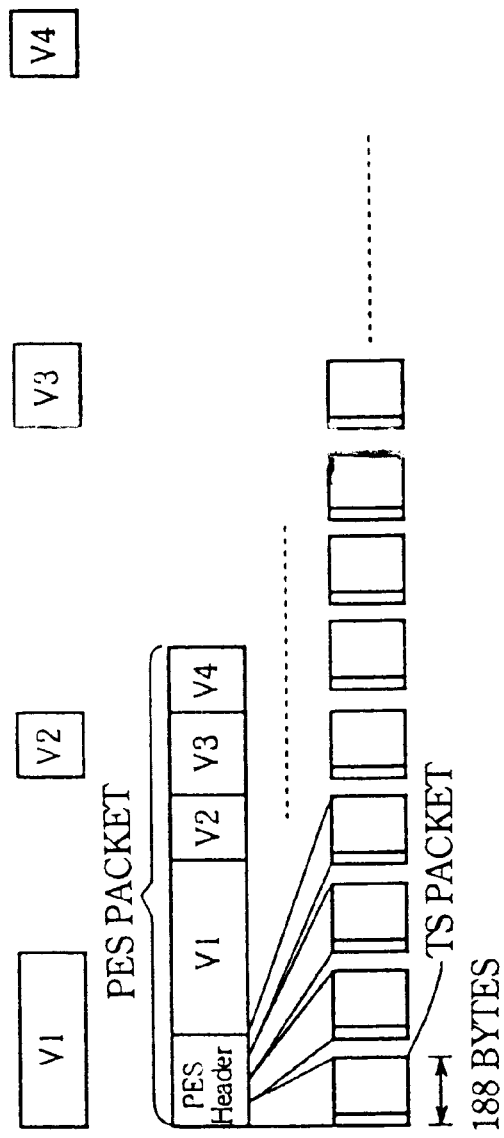
FIG.9A
FIG.9B
FIG.9C
FIG.9D

| video_sequence ( ) { | NUMBER OF BITS | MNEMONIC |
|---|---|---|
| next_start_code ( ) | | |
| sequence_header ( ) | | |
| sequence_extension ( ) | | |
| do { | | |
| extension_and_user_data (0) | | |
| do { | | |
| if (nextbits ( )==group_start_code) { | | |
| group_of_pictures_header ( ) | | |
| extension_and_user_data ( ) | | |
| } | | |
| picture_header ( ) | | |
| picture_coding_extension ( ) | | |
| extension_and_user_data (2) | | |
| picture_data ( ) | | |
| } while ((nextbits ( )==picture_start_code)|| | | |
| (nextbits ( )==group_start_code)) | | |
| if (nextbits ( )!=sequence_end_code) { | | |
| sequence_header ( ) | | |
| sequence_extension ( ) | | |
| } | | |
| } while (nextbits ( )!=sequence_end_code) | | |
| sequence_end_code | 32 | bslbf |
| ) | | |

FIG.10

SEQUENCE HEADER

| sequence_header ( ) { | NUMBER OF BITS | MNEMONIC |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | "1" |
| vbv_buffer_size_value | 10 | uimsbf |
| constrained_parameters_flag | 1 | |
| load_intra_quantise_matrix | 1 | |
| if (load_intra_quantiser_matrix) | | |
| intra_quantiser_matrix [64] | 8 * 64 | uimsbf |
| load_non_intra_quantiser_matrix | 1 | |
| if (load_non_intra_quantiser_matrix) | | |
| non_intra_quantiser_matrix [64] | 8 * 64 | uimsbf |
| next_start_code ( ) | | |
| } | | |

FIG.11

SEQUENCE EXTENSION

| sequence_extension ( ) { | BITS | MNEMONIC |
|---|---|---|
| extension_start_code | 32 | bslbf |
| extension_start_code_identifier | 4 | uimsbf |
| profile_and_level_indentifier | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bsalbf |
| vbv_buffer_size_extension | 8 | uimsbf |
| low_dalay | 1 | uimsbf |
| frame_rate_extension_n | 2 | uimsbf |
| frame_rate_extension_d | 5 | uimsbf |
| next_start_code ( ) | | |
| } | | |

FIG.12

EXTENSION DATA
AND USER DATA

| extension_and_user_data (i) { | NUMBER OF BITS | MNEMONIC |
|---|---|---|
| while (((i!=1) its ( ) && (nextbits ( ) extension_start_code)) \|\| | | |
| (nextbits ( ) == user_data_start_code)) { | | |
| if (nextbitS ( ) == extension_start_code) | | |
| extension_data (i) | | |
| if (nextbits ( ) = user_data_start_code) | | |
| user_data ( ) | | |
| } | | |
| } | | |

FIG.13

GROUP-OF-PICTURE
HEADER

| group_of_picture_header ( ) { | NUMBER OF BITS | MNEMONIC |
|---|---|---|
| group_start_code | 32 | bslbf |
| time_code | 25 | bslbf |
| cloused_gop | 1 | uimsbf |
| broken_link | 1 | uimsbf |
| next_start_code ( ) | | |
| } | | |

FIG.14

PICTURE HEADER

| picture header ( ) { | NUMBER OF BITS | MNEMONIC |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2\|\|picture_coding_type==3) { | | |
| full_pel_forward_vector | 1 | |
| forward_f_code | 3 | uimsbf |
| } | | |
| if(picture_coding_type==3) { | | |
| full_pel_backward_vector | 1 | |
| backward_f_code | 3 | uimsbf |
| } | | |
| while(nextbits( )=='1') { | | |
| extra_bit_picture /* with the value "1" */ | 1 | uimsbf |
| extra_information_picture | 8 | |
| } | | |
| extra_bit_picture /* with the value "0" */ | 1 | uimsbf |
| next_start_code( ) t | | |
| } | | |

FIG.15

PICTURE CODING
EXTENSION

| picture_coding_extension ( ) { | NUMBER OF BITS | MNEMONIC |
|---|---|---|
| extension_start_code | 32 | bslbf |
| extension_start_code_identifier | 4 | uimsbf |
| f_code[0][0]/ *forward horizontal*/ | 4 | uimsbf |
| f_code[0][1]/ *forward vertical*/ | 4 | uimsbf |
| f_code[1][0]/ *backward horizontal*/ | 4 | uimsbf |
| f_code[1][1]/ *backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if (composite_display_flag) { | | |
| v_axis | 1 | uimsbf |
| field_sequence | 3 | uimsbf |
| sub_carrier | 1 | uimsbf |
| burst_amplitude | 7 | uimsbf |
| sub_carrier_phase | 8 | uimsbf |
| } | | |
| next_start_code ( ) | | |
| } | | |

FIG.16

PICTURE DATA

| picture_data ( ) { | NUMBER OF BITS | MNEMONIC |
|---|---|---|
| do { | | |
| slice ( ) | | |
| } while (nextbits ( ) = = slice_start_code) | | |
| next_start_code ( ) | | |
| } | | |

FIG.17

| SYNTAX | NUMBER OF BITS | MNEMONIC |
|---|---|---|
| transport packet ( ) { | | |
| sync_byte | 8 | bslbf |
| transport_error_indicator | 1 | bslbf |
| payload_unit_start_indicator | 1 | bslbf |
| transport_priority | 1 | bslbf |
| PID | 13 | uimsbf |
| transport_scrambling_control | 2 | bslbf |
| adaptaion_field_control | 2 | bslbf |
| continuity_counter | 4 | uimsbf |
| if (adaptation_field_control==' || adaptation_field_control=' 11' ) { | | |
| adaptation field ( ) | | |
| } | | |
| if (adaptation_field_control==' || adaptation_field_control=' 11' ) { | | |
| for (i=0 ; 1< N ; i+t) { | | |
| data_byte | 8 | bslbf |
| } | | |
| } | | |
| } | | |

FIG.18

| SYNTAX | NUMBER OF BITS | MNEMONIC |
|---|---|---|
| adaptation_field ( ) { | | |
|    adaptation_field_length | 8 | unimbf |
|    if (adaptation_field_length > 0) { | | |
|      discontinuity_indicator | 1 | bslbf |
|      random_access_indicator | 1 | bslbf |
|      elementary_stream_priority_indicator | 1 | bslbf |
|      PCR_flag | 1 | bslbf |
|      OPCR_flag | 1 | bslbf |
|      splicing_point_flag | 1 | bslbf |
|      transport_private_data_flag | 1 | bslbf |
|      adaptation_field_extension_flag | 1 | bslbf |
|      if (PCR_flag==' 1') { | | |
|        program_clock_refernce_base | 33 | uimsbf |
|        reserved | 6 | bslbf |
|        progrqam_clock_reference_extension | 9 | uimsbf |
|      } | | |
|      if (OPCR)_flag==' 1') { | | |
|        original_program_clock_reference_base | 33 | uimsbf |
|        reserved | 6 | bslbf |
|        original_program_clock_reference_extension | 9 | uimsbf |
|    } | | |
|    if (splicing_point_flag==' 1') { | | |
|      splice_countdown | 8 | tcimsbf |
|    } | | |
|    if (transport_private_data_flag==' 1') { | | |
|      transport_private_data_length | 8 | uimsbf |
|      for (i=0 ; i< transport_private_data_length ; i+t) { | | |
|        provate_data_byte | 8 | bslbf |
|      } | | |
|    } | | |
|    if (adaptation_field_extension_flag==' 1') { | | |
|      adaptation_field_extension_length | 8 | unimsbf |
|      ltw_flag | 1 | bslbf |
|      piecewise_rate_flag | 1 | bslbf |
|      seamless_splice_flag | 1 | bslbf |
|      reserved | 5 | bslbf |
|      if (ltw_flag==' 1') { | | |
|        ltw_valid_flag | 1 | bslbf |
|        ltw_offset | 15 | unimsbf |
|      } | | |
|      if (piecewise_rate_flag==' 1') { | | |
|        reserved | 2 | bslbf |
|        piecewise_rate | 22 | uimsbf |
|      } | | |
|      if (seamless_splice_flag==' 1') { | | |
|        splice_type | 4 | bslbf |
|        DTS_next_AU[32..30] | 3 | bslbf |
|        marker_bit | 1 | bslbf |
|        DTS_next_AU[29..15] | 15 | bslbf |
|        marker_bit | 1 | bslbf |
|        DTS_next_AU[14..0] | 15 | bslbf |
|        maker_bit | 1 | bslbf |
|      } | | |
|      for (i=0 ; i<N ; i++) { | | |
|        reserved | 8 | bslbf |
|      } | | |
|    } | | |
|    for (i=0 ; i<N ; i++) { | | |
|      stuffing_byte | 8 | bslbf |
|    } | | |
|  } | | |
| } | | |

CODED STREAM SPLICING DEVICE AND METHOD, AND CODED STREAM GENERATING DEVICE AND METHOD

This is a continuation of copending International Application PCT/JP98/04497 having an international filing date of Oct. 5, 1998.

TECHNICAL FIELD

This invention relates to a coded stream splicing device, a coded stream splicing method, a coded stream generating device, and a coded stream generating method which are used in a digital broadcasting system. Particularly, it relates to a coded stream splicing device, a coded stream splicing method, a coded stream generating device, and a coded stream generating method which are adapted for generating a seamless spliced stream by splicing two coded streams at a stream level.

BACKGROUND OF THE INVENTION

FIG. 1 illustrates a current television broadcasting system. In the current television broadcasting system, broadcasting stations for distributing television programs to each household include a key station (or main station) $S_K$ for producing television programs on a nationwide scale, and a plurality of local stations (or branches) $S_A$, $S_B$ and $S_C$ affiliated with the key station for producing unique local television programs. The key station $S_K$ is a broadcasting station for producing nationwide television programs and transmitting the produced television programs to the local stations. The local stations are broadcasting stations for distributing, to households within the local areas, the original television programs sent from the key station through inter-station transmission and television programs produced by editing a part of the original television programs into unique local versions. For example, as shown in FIG. 1, the local station $S_A$ is a station for producing television programs to be transmitted to households in a broadcasting area $E_A$. The local station $S_B$ is a station for producing television programs to be transmitted to households in a broadcasting area $E_B$. The local station $S_C$ is a station for producing television programs to be transmitted to households in a broadcasting area $E_C$. Editing processing carried out at each local station is, for example, processing for inserting a unique local weather forecast program into a news program transmitted from the key station, or processing for inserting a local commercial into a program such as a movie or drama.

FIGS. 2A to 2C illustrate editing processing at each local station. FIG. 2A shows an original television program $PG_{OLD}$ produced at the key station. FIG. 2B shows a substitute television program $PG_{NEW}$ for local viewers produced at a local station. FIG. 2C shows a television program $PG_{EDIT}$ edited at a local station. The example of editing processing shown in FIGS. 2A to 2C is an example of editing processing for replacing a commercial CM1, a program 3 and a commercial CM3 of the original television programs transmitted from the key station with a commercial CM1', a program 3' and a commercial CM3' produced at the local station for local viewers. As a result of this editing processing at the local station, television programs for local viewers are produced in which the television programs produced at the key station (that is, a program 1, a program 2, a CM2 and a program 4) and the television programs produced at the local station (that is, the commercial CM1', the program 3' and the CM3') coexist.

The current television broadcasting system employs analog broadcasting for distributing analog base band television signals to each household. However, attempts have been recently made to replace the analog broadcasting system with a next-generation broadcasting system that uses a digital technique. The digital broadcasting system employs compression-coding of video data and audio data through a compression coding technique such as MPEG2 (Moving Picture Experts Group Phase 2), and transmits the coded streams to each household and other stations through land or satellite-based communication links. Particularly, from among broadcasting techniques proposed as the digital broadcasting system, the DVB (Digital Video Broadcasting) standard proposed as a next-generation broadcasting system in Europe is the most popular technique. This DVB standard is becoming the de facto standard.

With reference to FIG. 3, a typical digital transmission system for transmitting a program including video data and audio data from a transmitting side system to a receiving side system by using the MPEG standard will now be described.

In the typical digital transmission system, a transmission side system 10 has an MPEG video encoder 11, an MPEG audio encoder 12, and a multiplexer 13. A receiving side system 20 has a demultiplexer 21, an MPEG video decoder 22, and an MPEG audio decoder 23.

The MPEG video encoder 11 encodes base band source video data V on the basis of the MPEG standard, and outputs the coded stream as a video elementary stream ES. The MPEG audio encoder 12 encodes base band source audio data A on the basis of the MPEG standard, and outputs the coded stream as an audio elementary stream ES. The multiplexer 13 receives the video elementary stream from the MPEG video encoder 11 and the audio elementary stream from the MPEG audio encoder 12. The multiplexer 13 then converts the streams into the form of transport stream packets, thus generating transport stream packets corresponding to the video elementary stream and transport stream packets corresponding to the audio elementary stream. The multiplexer 13 multiplexes the transport stream packets so that the transport stream packet including the video elementary stream and the transport stream packet including the audio elementary stream coexist, thus generating a transport stream to be transmitted to the receiving system 20.

The demultiplexer 21 receives the transport stream transmitted through a transmission line, and demultiplexes the transport stream into the transport stream packets corresponding to the video elementary stream and the transport stream packets corresponding to the audio elementary stream. The demultiplexer 21 then generates the video elementary stream from the transport stream packets corresponding to the video elementary stream, and generates the audio elementary stream from the transport stream packets corresponding to the audio elementary stream. The MPEG video decoder 22 receives the video elementary stream from the demultiplexer 21, and decodes this video elementary stream on the basis of the MPEG standard, thus generating the base band video data V. The MPEG audio decoder 23 receives the audio elementary stream from the demultiplexer 21, and decodes this audio elementary stream on the basis of the MPEG standard, thus generating the base band audio data A.

In the case where the conventional analog broadcasting system is to be replaced with the digital broadcasting system using such a technique of digital transmission system, video data of television programs are transmitted to the local station from the key station in the form of a coded stream which is compression-coded on the basis of the MPEG2 standard. Therefore, to carry out editing processing at the local station for replacing a part of the original coded stream transmitted from the key station with a coded stream produced at the local station, the coded stream must be decoded once to restore the base band video data before the editing processing is carried out. That is, since the direction of prediction of each picture included in a coded stream in conformity to the MPEG standard is correlated with the direction of prediction of the preceding and subsequent pictures, an unrelated coded stream cannot be inserted at an arbitrary position on the stream. If such insertion is attempted, data at the seam of the coded streams become discontinuous and cannot be decoded accurately.

Therefore, to realize editing processing as described with reference to FIGS. 2A to 2C, it is necessary to carry out decoding processing for once decoding both an original coded stream supplied from the key station and a coded stream produced for local viewers so as to restore base band video signals, editing processing for editing the two base band video data to generate video data edited for broadcasting, and coding processing for again coding the edited video data to generate an edited coded video stream. However, since coding/decoding processing based on the MPEG standard is not 100% reversible, there is a problem that the picture quality is deteriorated as decoding processing and coding processing are repeated.

Thus, it is desirable to have a technique which enables editing in the state of coded streams without decoding supplied coded streams. The technique of connecting two different coded bit streams at the level of coded bit streams so as to generate connected bit streams is referred to as "splicing". In short, splicing means editing and connection of plural streams in the state of coded streams.

However, realization of this splicing processing has the following two problems.

The first problem will now be described.

In accordance with the MPEG standard used for the above-described MPEG video encoder 11 and MPEG video decoder 22, a bidirectionally predictive coding system is employed as the coding system. In this bidirectionally predictive coding system, three types of coding, that is, intra-frame coding, inter-frame forward predictive coding, and bidirectionally predictive coding, are carried out. Pictures obtained by the respective types of coding are referred to as I-picture (intra coded picture), P-picture (predictive coded picture), and B-picture (bidirectionally predictive coded picture). I-, P- and B-pictures are appropriately combined to form a GOP (Group of Pictures) as a unit for random access. In general, an I-picture has the largest quantity of generated bits, and P-picture has the second largest quantity of generated bits. B-picture has the smallest quantity of generated bits.

In the coding method in which the quantity of generated bits varies for each picture as in the MPEG standard, in order to accurately decode obtained coded bit streams (hereinafter referred to simply as streams) by the video decoder so as to obtain a picture, the data occupancy quantity in an input buffer of the video decoder 22 must be known by the video encoder 11. Thus, in accordance with the MPEG standard, a virtual buffer referred to as "VBV (Video Buffering Verifier) buffer" is provided as a buffer corresponding to the input buffer of the video decoder 22, and it is prescribed that the video encoder 11 carries out coding processing so as not to cause breakdown of the VBV buffer, that is, underflow or overflow of the buffer. For example, the capacity of the VBV buffer is determined in accordance with the standard of signals to be transmitted. In the case of standard video signals of main profile and main level (MP@ML), the VBV buffer has a capacity of 1.75 Mbits. The video encoder 11 controls the quantity of generated bits of each picture so as not to cause overflow or underflow of the VBV buffer.

The VBV buffer will now be described with reference to FIGS. 4A to 4C.

FIG. 4A shows an original stream $ST_{OLD}$ obtained by a video encoder by coding original television programs including a program 1 and a commercial CM1 produced at the key station, and the locus of the data occupancy quantity in the VBV buffer corresponding to the original stream $ST_{OLD}$. FIG. 4B shows a substitute stream $ST_{NEW}$ obtained by a video encoder of a local station by coding a commercial CM1' produced for local viewers for replacing the part of the commercial CM1 of the original television programs, and the locus of the data occupancy quantity in the VBV buffer corresponding to the substitute stream $ST_{NEW}$. In the following description, since a part of the stream obtained by coding the original television programs transmitted from the key station to the local station is replaced by a new stream, the original stream obtained by coding the original television programs is expressed as "$ST_{OLD}$", which indicates an old stream, and the new stream which is substituted for a part of the original stream $ST_{OLD}$ is expressed as "$ST_{NEW}$". FIG. 4C shows a spliced stream $ST_{SPL}$ obtained by splicing the substitute stream $ST_{NEW}$ into the original stream $ST_{OLD}$ at a splicing point SP, and the locus of the data occupancy quantity in the VBV buffer corresponding to the spliced stream $ST_{SPL}$.

In FIGS. 4A to 4C, right upward portions (sloped portions) of the locus of the data occupancy quantity in the VBV buffer express the transmission bit rate, and vertically falling portions express the quantity of bits read out from the decoder buffer by the video decoder for reproducing each picture. The timing at which the video decoder reads out bits from the decoder buffer is designated in accordance with information referred to as decoding time stamp (DTS). In FIGS. 4A to 4C, I, P and B represent I-picture, P-picture and B-picture, respectively.

The original coded stream $ST_{OLD}$ is a stream coded by the video encoder of the key station, and the substitute stream $ST_{NEW}$ is a stream coded by the video encoder of the local station. The original coded stream $ST_{OLD}$ and the substitute stream $ST_{NEW}$ are individually coded by their respective video encoders. Therefore, since the video encoder of the local station carries out coding processing for uniquely generating the substitute stream $ST_{NEW}$ without knowing the locus of the data occupancy quantity in the VBV buffer of the video encoder of the key station at all, the data occupancy quantity $VBV_{OLD}$ of the original stream $ST_{OLD}$ in the VBV buffer at the splicing point and the data occupancy quantity $VBV_{NEW}$ of the substitute stream $ST_{NEW}$ in the VBV buffer at the splicing point are different from each other.

In order to prevent discontinuity of the locus of the data occupancy quantity in the VBV buffer around the splicing point SP of the spliced stream $ST_{SPL}$, the initial level of the data occupancy quantity of the substitute stream $ST_{NEW}$ of the spliced stream $ST_{SPL}$ in the VBV buffer must be that of the data occupancy quantity $VBV_{OLD}$ in the VBV buffer. As a result, as shown in FIGS. 4A to 4C, if the value of the data occupancy quantity $VBV_{NEW}$ of the substitute stream $ST_{NEW}$ in the VBV buffer is smaller than the value of the data occupancy quantity $VBV_{OLD}$ of the original stream $ST_{OLD}$ in the VBV buffer, the VBV buffer will overflow at the part of the substitute stream $ST_{NEW}$ of the spliced stream $ST_{SPL}$. Further, if the value of the data occupancy quantity $VBV_{NEW}$ of the substitute stream $ST_{NEW}$ in the VBV buffer is greater than the value of the data occupancy quantity $VBV_{OLD}$ of the original stream $ST_{OLD}$ in the VBV buffer, the VBV buffer will underflow at the part of the substitute stream $ST_{NEW}$ of the spliced stream $ST_{SPL}$.

The second problem associated with splicing will now be described.

In a header of a stream coded on the basis of the MPEG standard, various data elements and flags indicative of the coded information are described. The coded stream is decoded by using these data elements and flags.

The programs 1, 2, 3 and 4 constituting the main portion of the original television programs shown in FIGS. 2A to 2C are not necessarily made up of television signals of the NTSC format, having a frame rate of 29.97 Hz (approximately 30 Hz) recorded by a video camera or the like, and may be made up of television signals converted from movie material having a frame rate of 24 Hz (24 frames per second). In general, processing for converting movie material of 24 Hz to television signals of 29.97 Hz is referred to as "2:3 pull-down processing" as it includes processing for converting two fields of the original material to three fields in a predetermined sequence.

FIG. 5 illustrates this 2:3 pull-down processing. In FIG. 5, T1 to T8 indicate top fields of a movie material having a frame frequency of 24 Hz, and B1 to B8 indicate bottom fields of the movie material having a frame frequency of 24 Hz. Ellipses and triangles shown in FIG. 5 indicate the structures of frames constituted by top fields and bottom fields.

In this example of 2:3 pull-down processing, four repeat fields are inserted into the movie material (eight top fields T1 to T8 and eight bottom fields B1 to B8) having a frame frequency of 24 Hz. The four repeat fields include a repeat field B2' generated by repeating the bottom field B2, a repeat field T4' generated by repeating the top field T4, a repeat field B6' generated by repeating the bottom field B6, and a repeat field T8' generated by repeating the top field T8. As a result, television signals having a frame frequency of 29.97 Hz are generated from the movie material having a frame frequency of 24 Hz.

In the MPEG encoder, the television signals obtained by 2:3 pull-down processing are not directly coded by the video encoder, but are coded after the repeat fields are removed from the 2:3 pull-down processed television signals. In the example shown in FIG. 5, the repeat fields B2', T4', B6' and T8' are removed from the 2:3 pull-down processed television signals. The reason for removing the repeat fields before coding processing is that the repeat fields are redundant fields inserted at the time of 2:3 pull-down processing and do not cause any deterioration in picture quality even when they are deleted for the purpose of improving the compression coding efficiency.

Also, in accordance with the MPEG standard, it is prescribed that a flag "repeat_first_field", indicating whether or not a repeat field should be generated by repeating any of two fields constituting a frame, be included in a coded stream. That is, in decoding a coded stream, if the flag "repeat_first_field" in the coded stream is "1", the MPEG decoder generates a repeat field. If the flag "repeat_first_field" in the coded stream is "0", the MPEG decoder does not generate a repeat field.

In the example shown in FIG. 5, "repeat_first_field" of a stream obtained by coding the frame constituted by the top field T1 and the bottom field B1 is "0", and "repeat_first_field" of a stream obtained by coding the frame constituted by the top field T2 and the bottom field B2 is "1". The flag "repeat_first_field" of a stream obtained by coding the frame constituted by the top field T3 and the bottom field B3 is "0", and "repeat_first_field" of a stream obtained by coding the frame constituted by the top field T4 and the bottom field B4 is "1". Therefore, in decoding the coded stream of the frame constituted by the top field T2 and the bottom field B2, the repeat field B2' is generated. In decoding the coded stream of the frame constituted by the top frame T4 and the bottom frame B4, the repeat field B4' is generated.

In addition, in accordance with the MPEG standard, it is prescribed that a flag "top_field_first", indicating whether the first field of two fields constituting a frame is a top field or a bottom field, is described in a coded stream. Specifically, if "top_field_first" is "1", it indicates a frame structure in which the top field is temporally preceding the bottom field. If "top_field_first" is "0", it indicates a frame structure in which the top field is temporally subsequent to the bottom field.

In the example of FIG. 5, "top_field_first" of the coded stream of the frame constituted by the top field T1 and the bottom field B1 is "0", and "top_field_first" of the coded stream of the frame constituted by the top field T2 and the bottom field B2 is "0". The flag "top_field_first" of the coded stream of the frame constituted by the top field T3 and the bottom field B3 is "1", and "top_field_first" of the coded stream of the frame constituted by the top field T4 and the bottom field B4 is "1".

With reference to FIGS. 6A to 6C, a problem generated with respect to the flags such as "top_field_first" and "repeat_first_field" defined in accordance with the MPEG standard when the coded stream is spliced will now be described.

FIG. 6A shows the frame structure of the original stream $ST_{OLD}$ obtained by coding the original television programs produced at the key station. FIG. 6B shows the frame structure of the substitute stream $ST_{NEW}$ obtained by coding the commercial CM1' for local viewers produced at the local station. FIG. 6C shows the frame structure of the spliced stream $ST_{SPL}$ obtained by splicing processing.

The program 1 and the program 2 in the original stream $ST_{OLD}$ are coded streams obtained by 2:3 pull-down processing, and each frame of the commercial CM1 of the main portion is a coded stream having the frame structure in which "top_field_first" is "0". The local commercial CM1' shown in FIG. 6B is a coded stream to replace the commercial CM1 in the original television programs, and has the frame structure in which "top_field_first" is "1". The spliced stream $ST_{SPL}$ shown in FIG. 6C is a stream generated by splicing the substitute stream $ST_{NEW}$ subsequent to the original stream $ST_{OLD}$ indicated by the program 1 and then splicing the original stream $ST_{OLD}$ indicated by the program 2 subsequent to the substitute stream $ST_{NEW}$. In short, the spliced stream $ST_{SPL}$ is a stream obtained by inserting the local commercial CM1' in place of the main commercial CM1 of the original stream $ST_{OLD}$.

The commercial CM1 produced at the key station shown in FIG. 6 is a coded stream with each frame having the frame structure in which "top_field_first" is "0". The commercial CM1' produced at the local station is a coded stream having the frame structure in which "top_field_first" is "1".

In the case where the frame structure of the commercial CM1 and the frame structure of the substitute commercial CM1' to replace the commercial CM1 are different from each other as shown in FIGS. 6A and 6B, if the stream of the commercial CM1' is spliced subsequently to the stream of the program 1 at a splicing point SP1 in the original stream $ST_{OLD}$, a field gap is generated in the spliced stream $ST_{SPL}$. The field gap means dropout of the bottom field B6 at the splicing point SP1 from the spliced stream $ST_{SPL}$, which causes discontinuity in the top field/bottom field pattern as shown in FIG. 6C.

The coded stream having a field gap is a coded stream which does not conform to the MPEG standard and cannot be normally decoded by an ordinary MPEG decoder.

On the other hand, if the stream of the program 2 is spliced subsequently to the commercial CM1' at a splicing point SP2 in the original stream $ST_{OLD}$, field duplication is generated in the spliced stream $ST_{SPL}$. This field duplication means the existence of a bottom field b12 and a bottom field B12 at the splicing point SP2 in the same display time, as shown in FIG. 6C.

The coded stream in which the field duplication exists is a coded stream which does not conform to the MPEG standard and cannot be normally decoded by an ordinary MPEG decoder.

In short, if splicing processing is carried out without regard to the field or frame pattern, the field pattern or the frame pattern becomes discontinuous and a spliced stream conforming to the MPEG standard cannot be generated.

SUMMARY OF THE INVENTION

It is an object of the present invention to provide a coded stream splicing device for realizing seamless splicing processing which generates a continuous locus of the data occupancy quantity of a spliced stream in the VBV buffer and prevents breakdown of the VBV buffer.

It is another object of the present invention to provide a coded stream splicing device for realizing seamless splicing processing which prevents discontinuity in the stream structure of a coded stream around a splicing point.

In order to realize the above objectives, a system for seamlessly splicing two encoded video streams is provided. In one implementation of the system, one or more coding parameters are extracted from the first and/or second encoded streams and one or more parameters of the first and/or second encoded streams are changed in accordance with the extracted parameter(s) in order to effectuate seamless splicing. In another implementation, the coding parameters applied to the first encoded stream are referenced when encoding the second stream such that the resulting second encoded stream can be seamlessly spliced with the first encoded stream.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 9A to 9D illustrate processing for generating a transport stream from an elementary stream in a stream conversion circuit.

FIG. 10 illustrates the syntax of a sequence of MPEG video elementary streams.

FIG. 11 illustrates the syntax of sequence header (sequence_header).

FIG. 12 illustrates the syntax of sequence extension (sequence_extension).

FIG. 13 illustrates the syntax of extension and user data (extension_and_user_data).

FIG. 14 illustrates the syntax of group-of-picture header (group_of_picture_header).

FIG. 15 illustrates the syntax of picture header (picture_header).

FIG. 16 illustrates the syntax of picture coding extension (picture_coding_extension).

FIG. 17 illustrates the syntax of picture data (picture_data).

FIG. 18 illustrates the syntax of transport stream packet.

FIG. 19 illustrates the syntax of adaptation field (adaptation_field).

BEST MODE FOR CARRYING OUT THE INVENTION

Figure 7:
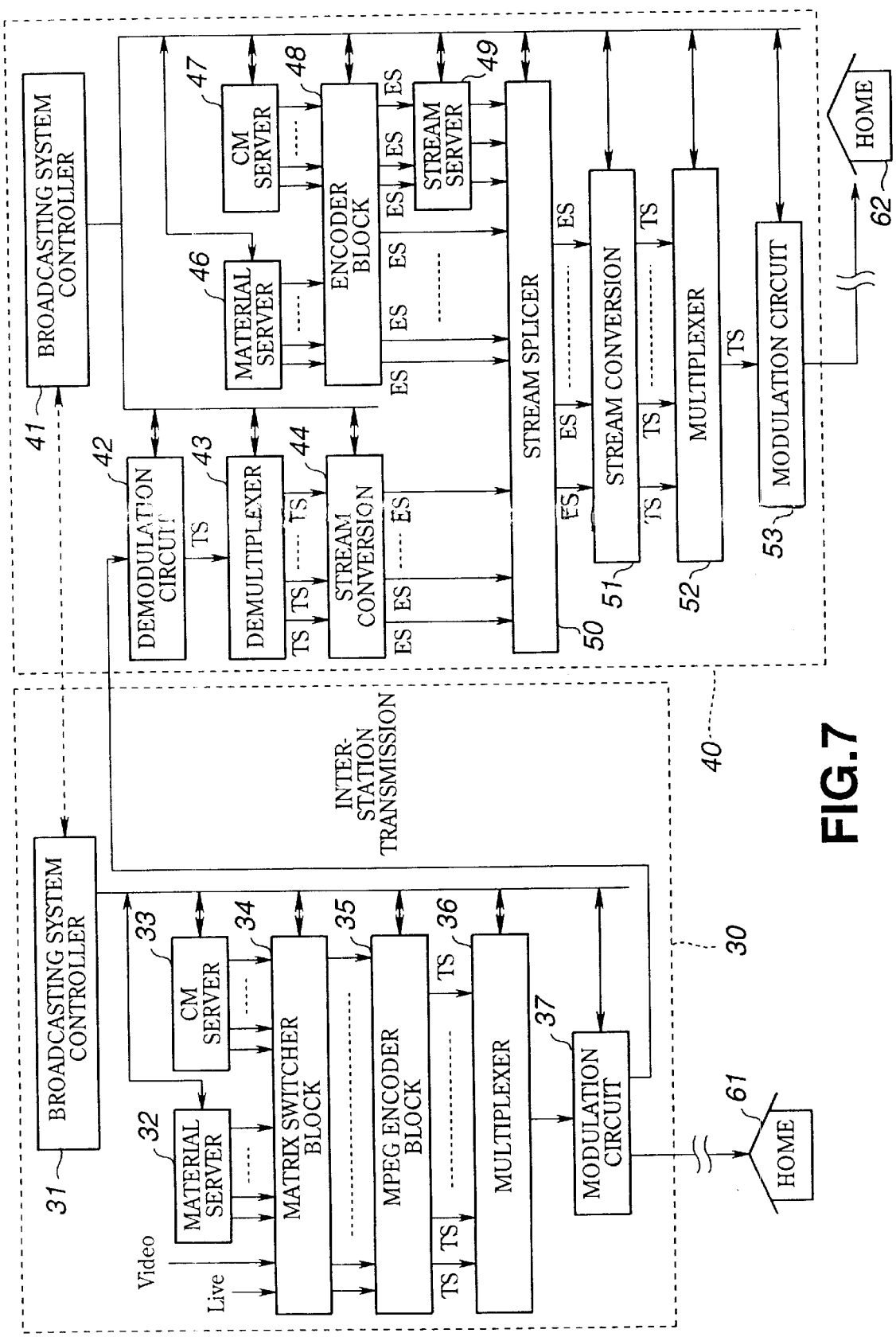
FIG. 7 is a block diagram showing the overall structure of a digital broadcasting system including a coded stream splicing device according to an embodiment of the present invention.

FIG. 7 illustrates the structure of a digital broadcasting system including a coded stream splicing device according to an embodiment of the present invention.

As shown in FIG. 7, the digital broadcasting system generally includes a key station 30 and a local station 40 affiliated with the key station.

The key station 30 is a broadcasting station for producing and transmitting television programs to affiliated local stations. The key station 30 includes a broadcasting system controller 31, a material server 32, a CM server 33, a matrix switcher block 34, an MPEG encoder block 35, a multiplexer 36, and a modulation circuit 37.

The broadcasting system controller 31 is used for comprehensively managing and controlling all the units and circuits provided at the broadcasting station such as the material server 32, the CM server 33, the matrix switcher block 34, the MPEG encoder block 35, the multiplexer 36 and the modulation circuit 37. In the broadcasting system controller 31, a program editing table is stored for use in managing the broadcasting time of all the materials such as program materials supplied from a program providing company and program materials and CM materials produced at the key station itself. In accordance with the program editing table, the broadcasting system controller 31 controls the above-described units and circuits. The program editing table includes, for example, an event information file in which the broadcasting program schedule for every hour or every day is recorded, an operation information file in which the time schedule of broadcasting programs for every 15 seconds is recorded, and so on.

Figure 1:
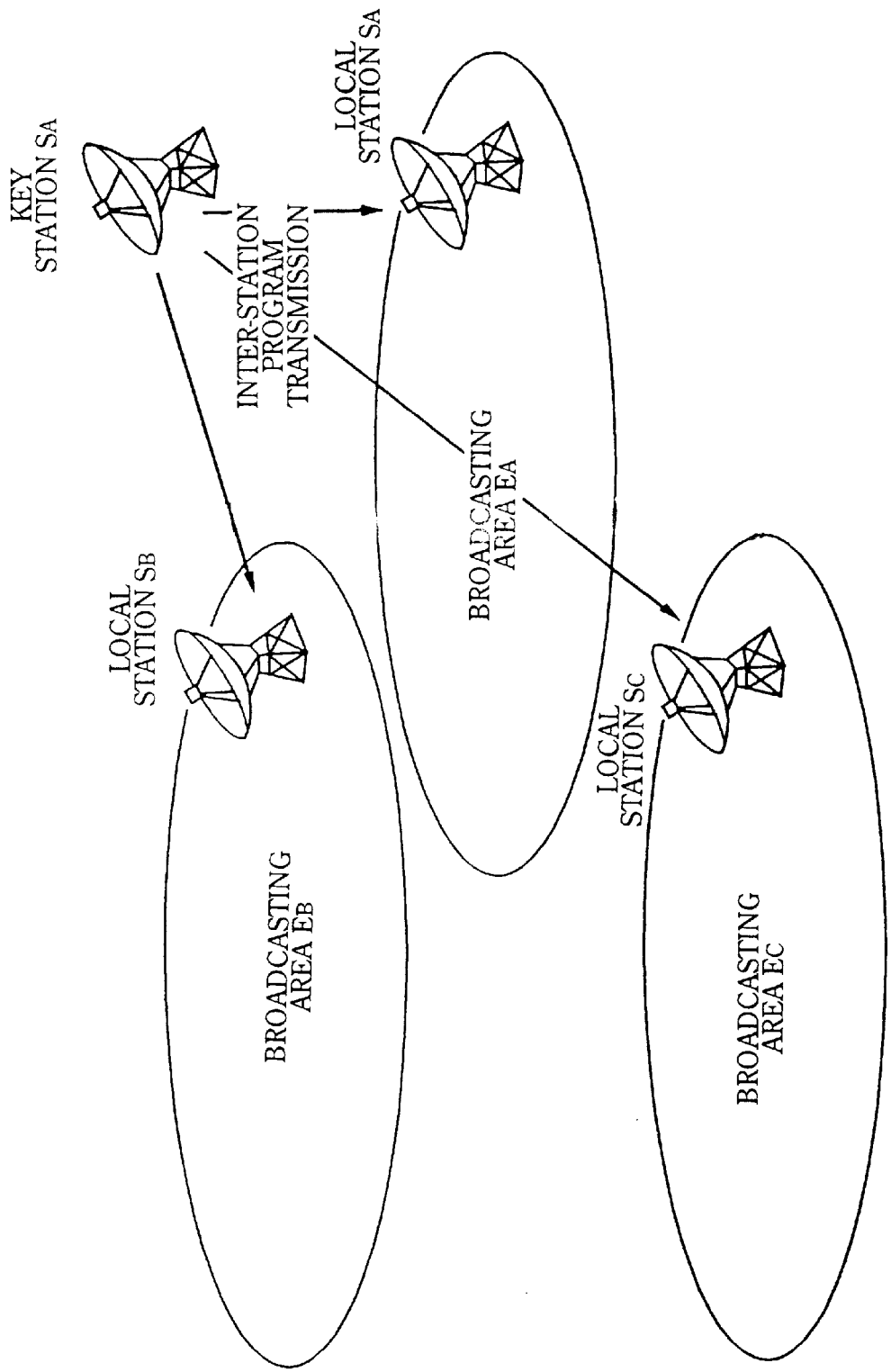
FIG. 1 illustrates a typical television broadcasting system.
Figure 2:
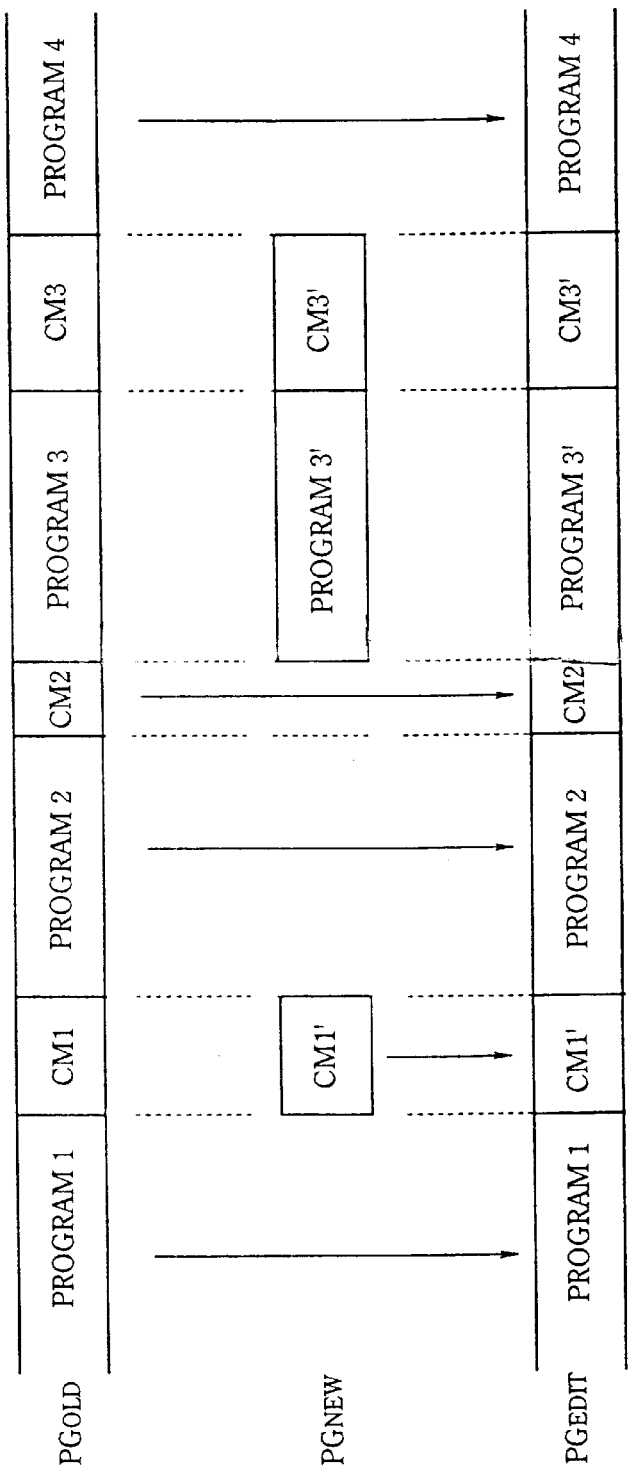
FIGS. 2A to 2C illustrate editing processing of television programs at a local station.
Figure 3:
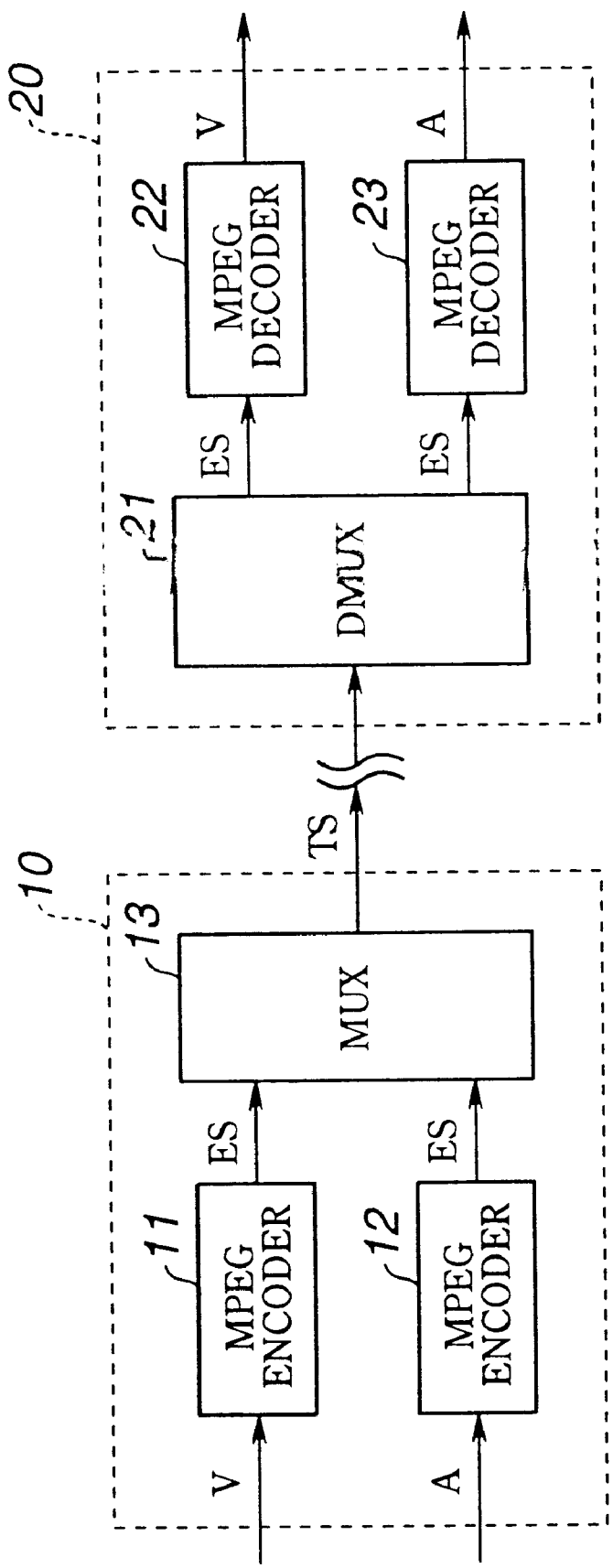
FIG. 3 illustrates a typical digital transmission system using the MPEG standard.
Figure 4A:
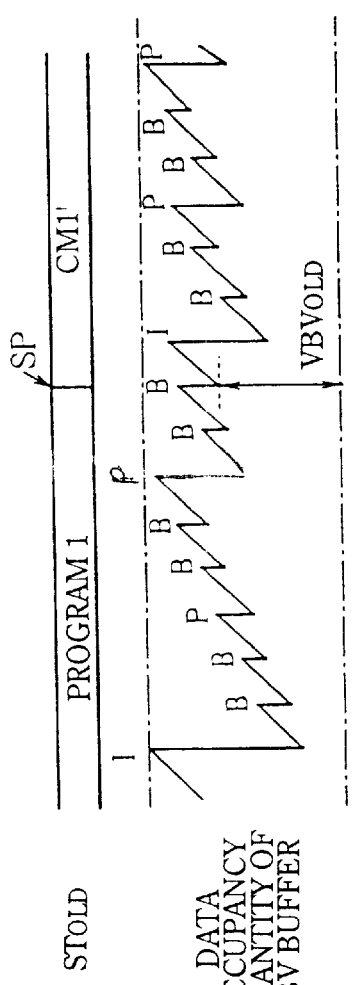
FIGS. 4A to 4C illustrate the data occupancy of a VBV buffer during editing processing.
Figure 4B:
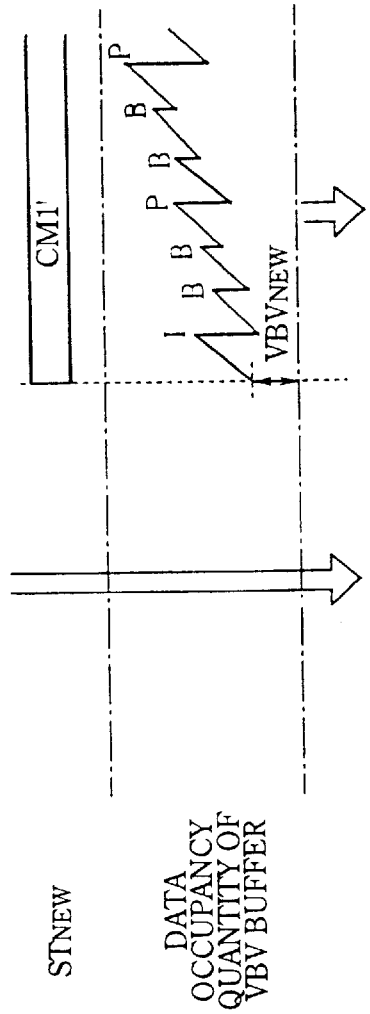
Figure 4C:
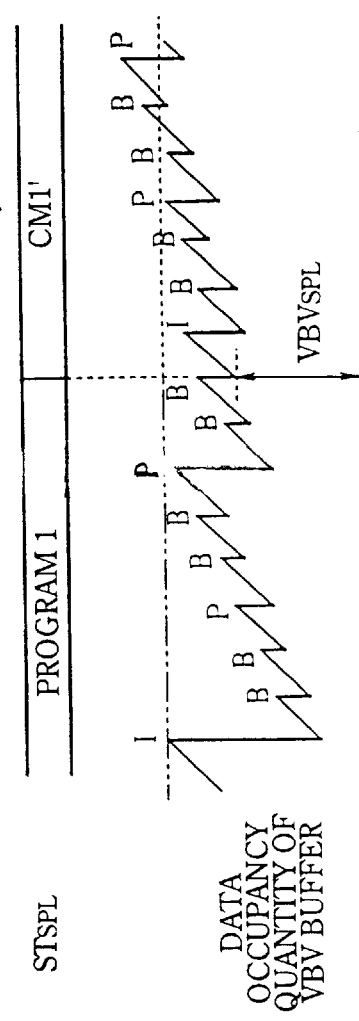
Figure 5:
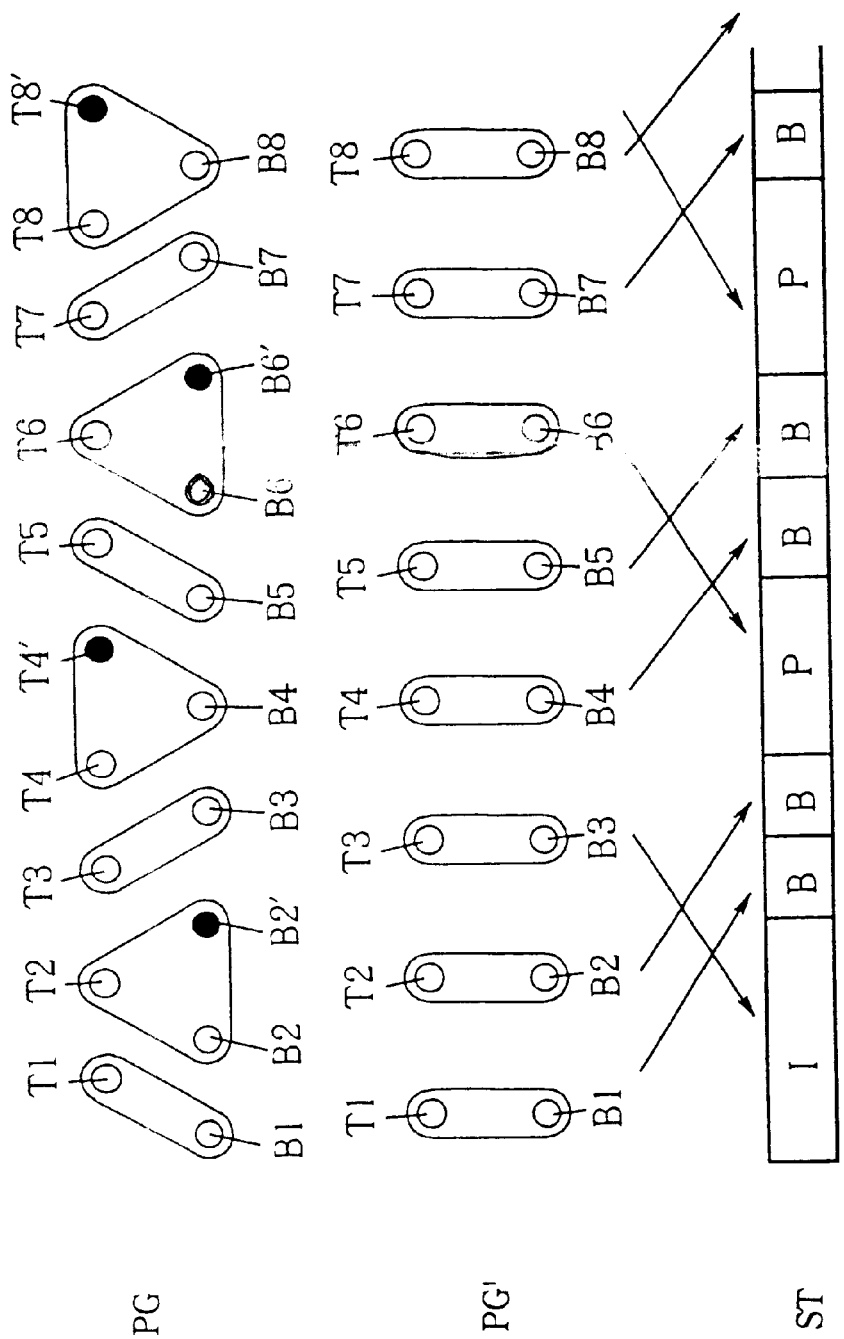
FIG. 5 illustrates 2:3 pull-down processing.

The material server 32 is a server for storing video data and audio data of movie programs, sports programs, entertainment programs and news programs to be broadcast as main portions of television programs, and outputting a program designated by the broadcasting system controller 31 at a time conforming to the time schedule on the program editing table. The movie program includes video data obtained by converting a film material having a frame frequency of 24 Hz to television signals having a frame frequency of 30 Hz by 2:3 pull-down processing, as described above. The video data and audio data outputted as a program of the main portion from the material server 32 are supplied to the matrix switcher block 34. In the example shown in FIGS. 2A to 2C, the program 1, the program 2, the program 3 and the program 4 are recorded in this material server 32. The video data and audio data stored in the material server 32 are base band video data and audio data which are not compression-coded.

The CM server 33 is a server for storing commercials to be inserted between the programs of the main portion reproduced from the material server 32, and outputting a commercial designated by the broadcasting system controller 31 at a time conforming to the time schedule on the program editing table. The video data and audio data outputted as a commercial from the CM server 33 are supplied to the matrix switcher block 34. In the example shown in FIGS. 2A to 2C, the commercial CM1, the commercial CM2 and the commercial CM3 are recorded in this CM server 33. The video data and audio data stored in the CM server 33 are base band video data and audio data which are not compression-coded.

The matrix switcher block 34 has a matrix circuit for routing live programs such as live sports broadcast and news programs, the main programs outputted from the material server 32, and the commercial programs outputted from the CM server 33. The matrix switcher block 34 also has a switching circuit for connecting and switching the main programs supplied from the material server 32 and the commercial programs supplied from the CM server 33, in conformity with the time schedule in the program editing table determined by the broadcasting system controller. By switching the main programs and the CM programs using this switching circuit, the transmission program $PG_{OLD}$ shown in FIG. 2A can be generated.

The MPEG encoder block 35 is a block for coding the base band video data and audio data outputted from the matrix switcher block on the basis of the MPEG2 standard, and has a plurality of video encoders and audio encoders.

The multiplexer 36 multiplexes nine channels of transport streams outputted from the MPEG encoder block 35, thus generating one multiplexed transport stream. In the multiplexed transport stream, transport stream packets including coded video elementary streams of nine channels and transport stream packets including coded audio elementary streams of nine channels exist in a mixed manner.

The modulation circuit 37 carries out QPSK modulation of the transport stream, and transmits the modulated data to the local station 40 and a household 61 through a transmission link.

The overall structure of the local station 40 will now be described with reference to FIG. 7.

The local station 40 is a broadcasting station for editing the common television programs transmitted from the key station for local viewers, and broadcasting the television programs edited for local viewers to each household. The local station 40 includes a broadcasting system controller 41, a demodulation circuit 42, a demultiplexer 43, a stream conversion circuit 44, a material server 46, a CM server 47, an encoder block 48, a stream server 49, a stream splicer 50, a stream processor 51, a multiplexer 52, and a modulation circuit 53.

The broadcasting system controller 41 is used for comprehensively managing and controlling all the units and circuits provided at the local station such as the demodulation circuit 42, the demultiplexer 43, the stream conversion circuit 44, the material server 46, the CM server 47, the encoder block 48, the stream server 49, the stream splicer 50, the stream processor 51, the multiplexer 52 and the modulation circuit 53. In the broadcasting system controller 41, in a manner similar to the broadcasting system controller 31 of the key station 30, a program editing table is stored for the purpose of managing the broadcasting time of edited television programs obtained by inserting programs and CMs produced at the local station into the transmission program supplied from the key station 30. In accordance with this program editing table, the broadcasting system controller 41 controls the above-described units and circuits.

The demodulation circuit 42 carries out QPSK demodulation of the transmission program transmitted from the key station 30 through the transmission link, thereby generating a transport stream.

The demultiplexer 43 demultiplexes the transport stream outputted from the demodulation circuit 42 to generate transport streams of nine channels, and outputs the transport stream of each channel to the stream conversion circuit 44. In short, this demultiplexer 43 carries out reverse processing of the processing of the multiplexer 36 of the key station 30.

The stream conversion circuit 44 is a circuit for converting the transport streams supplied from the demultiplexer 43 into the form of elementary streams.

The material server 46 is a server which stores video data and audio data of entertainment programs, news programs and the like to be broadcast as television programs for local viewers. The CM server 47 is a server for storing video data and audio data of local commercials to be inserted between the main programs supplied from the key station 30. The video data and audio data stored in the material server 46 and the CM server 47 are base band video data and audio data which are compression-coded.

The encoder block 48 is a block for coding the video data of plural channels and the audio data of plural channels supplied from the material server 46 and the CM server 47, and has a plurality of video encoders and a plurality of audio encoders corresponding to the plural channels. The difference between the encoder block 48 and the MPEG encoder block 35 of the key station is that the encoder block 48 of the local station 40 outputs the elementary streams while the MPEG encoder block 35 of the key station 30 outputs the transport stream. However, the encoder block 48 is essentially the same as the MPEG encoder block 35 of the key station 30. From among the elementary streams of plural channels outputted from the encoder block 48, elementary streams of three channels are supplied to the stream server 49, and elementary streams of the remaining channels are supplied to the stream splicer 50.

The stream server 49 receives the elementary streams of three channels supplied from the encoder block. The stream server 49 then records the elementary streams in the state of streams into a randomly accessible recording medium, and reproduces the elementary streams from the randomly accessible recording medium under the control of the broadcasting system controller 41.

The stream splicer 50 is a block for receiving the plural elementary streams supplied from the encoder block 48 and the stream server 49, and routing the elementary streams to predetermined output lines, and for splicing the elementary streams supplied from the key station 30 and the elementary streams produced at the local station 40, at the stream level. The processing by the stream splicer 50 will be later described in detail.

The stream conversion circuit 51 is a circuit for receiving the elementary streams outputted as spliced streams from the stream splicer 50, and converting the elementary streams into transport streams.

The multiplexer 52 multiplexes the transport streams of nine channels outputted from the stream conversion circuit, thus generating one multiplexed transport stream, and thus functions in a manner similar to the multiplexer 36 of the key station 30.

The modulation circuit 53 carries out QPSK modulation of the transport stream, and distributes the modulated data to each household 62 through a transmission line.

Figure 8:
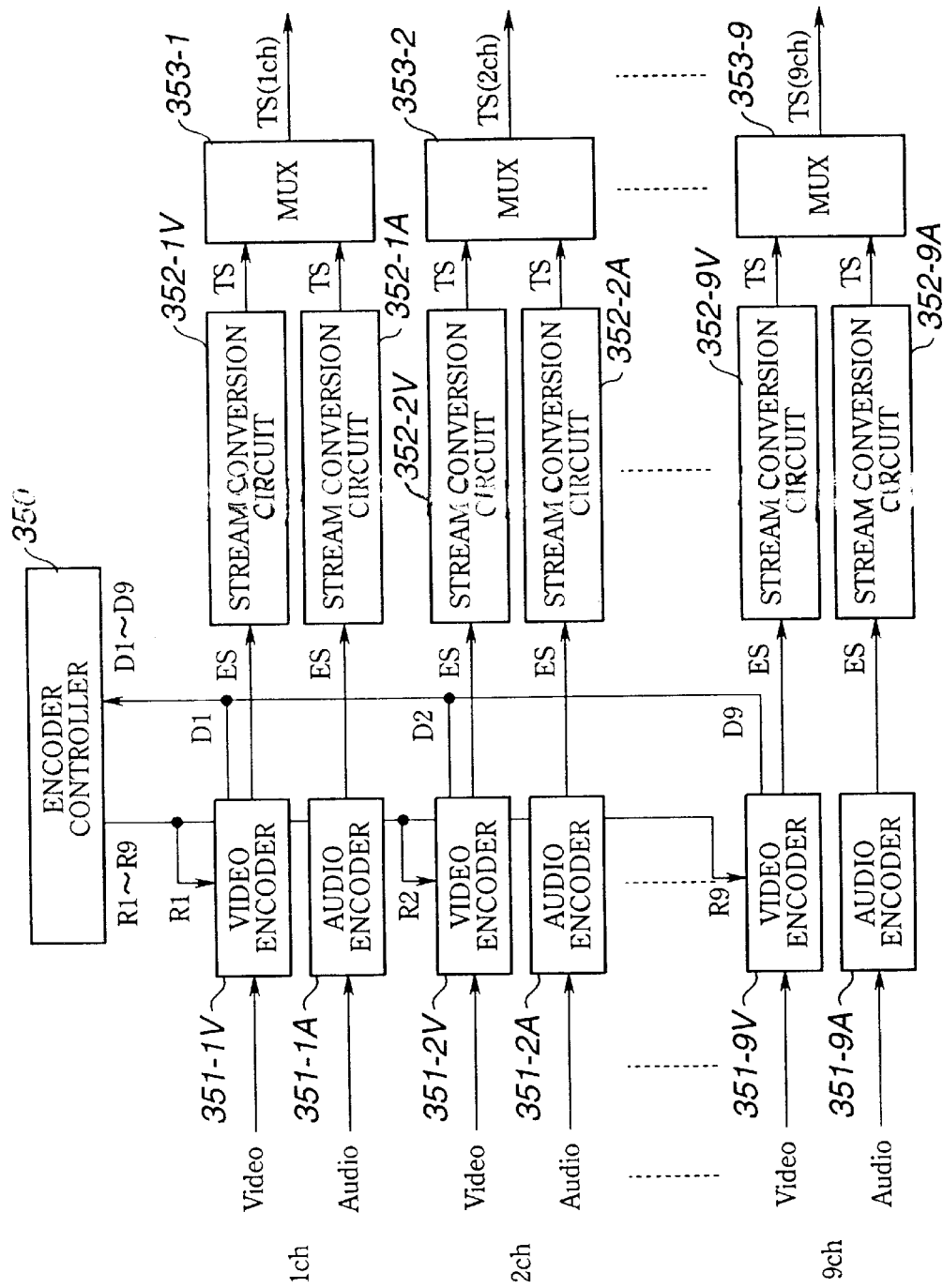
FIG. 8 is a block diagram for explaining in detail the structure of an MPEG encoder block 35 of a key station 30 and an encoder block of a local station 40.

FIG. 8 is a block diagram for explaining, in detail, the structure of the MPEG encoder block 35 of the key station 30 and the encoder block 48 of the local station 40. Since the MPEG encoder block 35 of the key station 30 and the encoder block 48 of the local station 40 have substantially the same structure, the structure and function of the MPEG encoder 35 of the key station 30 will be described by way of example.

The MPEG encoder block 35 has an encoder controller 350 for controlling all the circuits of the MPEG encoder block 35 in a centralized manner, a plurality of MPEG video encoders 351-1V to 351-9V for encoding supplied video data of plural channels, and MPEG audio encoders 351-1A to 351-9A for coding plural audio data corresponding to the video data on the basis of the MPEG2 standard.

The MPEG encoder block 35 also has stream conversion circuits 352-1V to 352-9V for converting the coded elementary streams (ES) outputted from the video encoders 351-1V to 351-9V into transport streams, and stream conversion circuits 352-1A to 352-9A for converting the coded elementary streams (ES) outputted from the audio encoders 351-1A to 351-9A into transport streams. The MPEG encoder block 35 also has a multiplexer 353-1 for multiplexing the transport stream including the video elementary stream of a first channel (1ch) and the transport stream including the audio elementary stream of the first channel (1ch) for each transport stream packet, a multiplexer 353-2 for multiplexing the transport stream including the video elementary stream of a second channel (2ch) and the transport stream including the audio elementary stream of the second channel (2ch) for each transport stream packet, . . . , and a multiplexer 353-9 for multiplexing the transport stream including the video elementary stream of a ninth channel (9ch) and the transport stream including the audio elementary stream of the ninth channel (9ch) for each transport stream packet.

The MPEG encoder block 35 shown in FIG. 8 has a structure for encoding transmission programs of nine channels. However, it is a matter of course that the number of channels is not limited to nine and may be any number.

The MPEG encoder block 35 carries out control of statistical multiplexing for dynamically changing the transmission rate of the transmission program of each channel in accordance with the pattern of video data to be coded. According to this statistical multiplexing technique, in the case where the pattern of a first picture of a transmission program of a channel is relatively simple and requires only a small number of bits for coding while the pattern of a second picture of another program is relatively complicated and requires a large number of bits for coding, bits for coding the first picture of the one channel are allocated to bits for coding the second picture of the other channel, thereby realizing efficient use of the transmission link. The method for dynamically changing the coding rate of each video encoder will be briefly described hereinafter.

The video encoders 351-1V to 351-9V first generate difficulty data (D1 to D9) each indicating the quantity of bits required for coding a target picture. The difficulty data is based on statistical quantities such as motion compensation residual and intra-AC obtained as a result of motion compensation before coding processing. The difficulty data is information indicating the coding difficulty. A large difficulty value indicates that the pattern of a target picture is complicated, and a small difficulty value indicates that the pattern of a target picture is simple. The difficulty data can be roughly estimated on the basis of the statistical quantity such as intra-AC and motion estimation residual (ME residual) used at the time of coding processing by the video encoders.

The encoder controller 350 receives the difficulty data D1 to D9 outputted from the video encoders 351-1V to 351-9V, respectively, and calculates target bit rates R1 to R9 for the video encoders 351-1V to 351-9V on the basis of the difficulty data D1 to D9, respectively. Specifically, the encoder controller 350 can find the target bit rates R1 to R9 by proportionally distributing the total transmission rate Total_Rate of the transmission link using the difficulty data D1 to D9, as shown in the following equation (1).

$$Ri=(Di/\Sigma Dk)\times Total\_Rate \tag{1}$$

In the equation (1), "Ri" represents the target bit rate of the transmission program of the channel "i", and "Di" represents the difficulty data for coding the picture of the transmission program of the channel "i". "Σ" represents the sum of difficulty data for the 9 channels (i.e. k=1 to 9).

The encoder controller 350 supplies the target bit rates R1 to R9 calculated on the basis of the equation (1), to the corresponding video encoders 351-1V to 351-9V. The target bit rates R1 to R9 may be calculated for each picture or for each GOP.

The video encoders 351-1V to 351-9V receive the target bit rates R1 to R9 supplied from the encoder controller 350, and carry out coding processing corresponding to the target bit rates R1 to R9. By thus dynamically changing the bit rate of the coded stream outputted from each video encoder on the basis of the difficulty data indicating the coding difficulty of the picture to be coded, the optimum quantity of bits can be allocated with respect to the coding difficulty of the picture to be coded, and the total quantity of bit rates outputted from the video encoders is prevented from exceeding the total transmission rate Total_Rate of the transmission link.

The stream conversion circuits 352-1V to 352-9V and the stream conversion circuits 352-1A to 352-9A are circuits for converting elementary streams into transport streams.

With reference to FIGS. 9A to 9D, a process of generating a transport stream from video elementary streams will be described, using an example in which supplied source video data is coded by the video encoder 351-1V to generate a video elementary stream, which is then converted into a transport stream by the stream conversion circuit 352-1V.

FIG. 9A shows source video data supplied to the video encoder 351-1V, and FIG. 9B shows video elementary streams (ES) outputted from the video encoder 351-1V. FIG. 9C shows a packetized elementary stream (PES), and FIG. 9D shows a transport stream (TS).

The data quantity of elementary streams coded in accordance with the MPEG2 standard such as the streams V1, V2, V3 and V4 shown in FIG. 9B varies depending upon the picture type of a video frame (I-picture, P-picture or B-picture) and presence/absence of motion compensation. The packetized elementary stream (PES) shown in FIG. 9C is generated by packetizing the plural elementary streams and adding a PES header at the leading end thereof. For example, the PES header includes a 24-bit packet start code indicating the start of the PES packet, an 8-bit stream ID indicating the type of stream data to be housed in a real data part of the PES packet (e.g., video and audio type), a 16-bit packet length indicating the length of subsequent data, code data indicating a value "10", a flag control part in which various flag information is stored, an 8-bit PES header length indicating the length of data of a conditional coding part, and the conditional coding part of a variable length in which reproduction output time information referred to as PTS (Presentation Time Stamp) and time management information at the time of decoding referred to as DTS (Decoding Time Stamp), or stuffing bytes for adjusting the data quantity are stored.

The transport stream (TS) is a data array of transport stream packets each consisting of a 4-byte TS header and a payload part in which 184-byte real data is recorded. To generate this transport stream packet (TS packet), first, a data stream of a PES packet is resolved for every 184 bytes, and the 184-byte real data is inserted into the payload part of a TS packet. Then, a 4-byte TS header is added to the 184-byte payload data, thus generating a transport stream packet.

Hereinafter, the syntax and structure of the elementary stream will be described with reference to FIGS. 10 to 17, and the syntax and structure of the transport stream will be described in detail with reference to FIGS. 18 and 19.

FIG. 10 shows the syntax of MPEG video elementary streams. The video encoders 351-1V to 351-9V in the video encoder block 35 generate coded elementary streams in accordance with the syntax shown in FIG. 10. In the syntax which will be described hereinafter, functions and conditional sentences are expressed by regular types, and data elements are expressed by bold types. Data items are described as the name, bit length, and mnemonic indicating the type and transmission order.

First, the functions used in the syntax shown in FIG. 10 will be described. Practically, the syntax shown in FIG. 10 is a syntax used for extracting data of predetermined meaning from the transmitted coded streams on the side of the video decoder. The syntax used on the side of the video encoder is a syntax obtained by omitting if-clauses and while-clauses from the syntax of FIG. 10.

A next_start_code( ) function, described in the first place in video_sequence( ), is a function for searching for a start code described in the bit stream. In the coded stream generated in accordance with the syntax shown in FIG. 10, data elements defined by a sequence_header( ) function and a sequence_extension( ) function are described first. This sequence_header( ) function is a function for defining header data of a sequence layer of the MPEG bit stream. The sequence_extension( ) function is a function for defining extension data of the sequence layer of the MPEG bit stream.

A do { } while sentence, arranged next to the sequence_extension( ) function, is a sentence indicating that the data element described on the basis of the function in { } of the do-clause is described in the coded data stream while the condition defined by the while-clause is true. A nextbits( ) function used in the while-clause is a function for comparing a bit or a bit array described in the bit stream with a reference data element. In the example of syntax shown in FIG. 10, the nextbits( ) function compares a bit array in the bit stream with sequence_end_code indicating the end of the video sequence. When the bit array in the bit stream and sequence_end_code do not coincide with each other, the condition of the while-clause becomes true. Thus, the do { } while sentence, arranged next to the sequence_extension( ) function, indicates that the data element defined by the function in the do-clause is described in the coded bit stream while sequence_end_code indicating the end of the video sequence do not appear in the bit stream.

In the coded bit stream, each data element defined by the sequence_extension( ) function is followed by a data element defined by an extension_and_user_data(0) function. This extension_and_user_data(0) function is a function for defining extension data and user data in the sequence layer of the MPEG bit stream.

A do { } while sentence, arranged next to the extension_and_user_data(0) function, is a function indicating that the data element described on the basis of the function in { } of the do-clause is described in the bit stream. A nextbits( ) function used in the while-clause is a function for determining coincidence between a bit or a bit array appearing in the bit stream and picture_start_code or group_start_code. If the bit or the bit array appearing in the bit stream and picture_start_code or group_start_code coincide with each other, the condition defined by the while-clause becomes true. Therefore, this do { } while sentence indicates that if picture_start_code or group_start_code appears in the coded bit stream, the code of the data element defined by the function in the do-clause is described next to the start code.

An if-clause described in the first place of this do-clause indicates such a condition that group_start_code appears in the coded bit stream. If the condition of this if-clause is true, data elements defined by a group_of_picture_header( ) function and an extension_and_user_data(1) function are sequentially described next to group_start_code in the coded bit stream.

This group_of_picture_header( ) function is a function for defining header data of a GOP layer of the MPEG coded bit stream. The extension_and_user_data(1) function is a function for defining extension data and user data of the GOP layer of the MPEG coded bit stream.

Moreover, in this coded bit stream, the data elements defined by the group_of_picture_header( ) function and the extension_and_user_data(1) function are followed by data elements defined by a picture_header( ) function and a picture_coding_extension( ) function. As a matter of course, if the above-described condition of the if-clause is not true, the data elements defined by the group_of_ picture_header( ) function and the extension_and_user_data(1) function are described. Therefore, next to the data element defined by the extension_and_user_data(0) function, data elements defined by the picture_header( ) function, the picture_coding_extension( ) function and an extension_and_user_data(2) function are described.

This picture_header( ) function is a function for defining header data of a picture layer of the MPEG coded bit stream. The picture_coding_extension( ) function is a function for defining first extension data of the picture layer of the MPEG coded bit stream. The extension_and_user_data(2) function is a function for defining extension data and user data of the picture layer of the MPEG coded bit stream. The user data defined by the extension_and_user_data(2) function is data described in the picture layer and can be described for each picture. Therefore, in the present invention, time code information is described as the user data defined by the extension_and_user_data(2) function.

In the coded bit stream, the user data of the picture layer is followed by a data element defined by a picture_data( ) function. This picture_data( ) function is a function for describing data elements related to a slice layer and a macroblock layer.

A while-clause described next to the picture_data( ) function is a function for determining the condition of the next if-clause while the condition described by this while-clause is true. A nextbits( ) function used in the while-clause is a function for determining whether or not picture_start_code or group_start_code is described in the coded bit stream. If picture_start_code or group_start_code is described in the bit stream, the condition defined by this while-clause becomes true.

The next if-clause is a conditional sentence for determining whether or not sequence_end_code is described in the coded bit stream. It indicates that if sequence_end_code is not described, data elements defined by a sequence_header( ) function and a sequence_extension( ) function are described. Since sequence_end_code is a code indicating the end of sequence of the coded video stream, the data elements defined by the sequence_header( ) function and the sequence_extension( ) function are described unless the coded stream ends.

The data elements defined by the sequence_header( ) function and the sequence_extension( ) function are perfectly the same as the data elements defined by the sequence_header( ) function and the sequence_extension( ) function described at the leading end of the video stream sequence. The same data are thus described in the stream for the following reason. That is, if the bit stream receiving device starts receiving at a halfway point of the data stream (for example, a bit stream portion corresponding to the picture layer), the data of the sequence layer cannot be received and the stream cannot be decoded. The reason for describing the same data is to prevent such a situation.

Next to the data elements defined by the last sequence_header( ) function and sequence_extension( ) function, that is, at the last part of the data stream, 32-bit sequence_end_code indicating the end of the sequence is described.

The sequence_header( ) function, sequence_extension( ) function, extension_and_user_data(0) function, group_of_picture_header( ) function, and extension_and_user_data(1) function will now be described in detail.

FIG. 11 illustrates the syntax of the sequence_header( ) function. The data elements defined by the sequence_header( ) function include sequence_header_code, sequence_header_present_flag, horizontal_size_value, vertical_size_value, aspect_ratio_information, frame_rate_code, bit_rate_value, marker_bit, vbv_buffer_size_value, constrained_parameter_flag, load_intra_quantizer_matrix, intra_quantizer_matrix, load_non_intra_quantizer_matrix, and non_intra_quantizer_matrix.

The sequence_header_code is data expressing a start synchronizing code of the sequence layer. The sequence_header_present_flag is data indicating whether the data in sequence_header is valid or invalid. The horizontal_size_value is data consisting of lower 12 bits of the number of horizontal pixels of the picture. The vertical_size_value is data consisting of lower 12 bits of the number of vertical lines of the picture. The aspect_ratio_information is data expressing the aspect ratio of pixels or the aspect ratio of the display screen. The frame_rate_code is data expressing the display cycle of the picture. The bit_rate_value is data of lower 18 bits (rounded up for every 400 bps) of the bit rate for limitation to the quantity of generated bits. The marker_bit is bit data to be inserted to prevent start code emulation. The vbv_buffer_size value is data of lower 10 bits of a value determining the size of the virtual buffer (video buffer verifier) for controlling the quantity of generated codes. The constrained_parameter_flag is data indicating that each parameter is within the limit. The load_intra_quantizer_matrix is data indicating the existence of quantization matrix data for intra MB. The intra_quantizer_matrix is data indicating the value of the quantization matrix data for intra MB. The load_non_intra_quantizer_matrix is data indicating the existence quantization matrix data for non-intra MB. The non_intra_quantizer_matrix is data expressing the value of the quantization matrix for non-intra MB.

FIG. 12 illustrates the syntax of the sequence_extension( ) function. The data elements defined by the sequence_extension( ) function include extension_start_code, extension_start_code_identifier, sequence_extension_present_flag, profile_and_level_indication, progressive_sequence, chroma_format, horizontal_size_extension, vertical_size_extension, bit_rate_extension, vbv_buffer_size_extension, low_delay, frame_rate_extension_n, and frame_rate_extension_d.

The extension_start_code is data indicating expressing a start synchronizing code of extension data. The extension_start_code_identifier is data indicating which extension data is to be transmitted. The sequence_extension_present_flag is data indicating whether data in the sequence extension is valid or invalid. The profile_and_level_indication is data for designating the profile and level of the video data. The progressive_sequence is data indicating that the video data is sequentially scanned data. The chroma_format is data for designating the color-difference format of the video data. The horizontal_size_extension is data of upper two bits to be added to horizontal_size_value of the sequence header. The vertical_size_extension is data of upper two bits to be added to vertical_size_value of the sequence header. The bit_rate_extension is data of upper 12 bits to be added to bit_rate_value of the sequence header. The vbv_buffer_size_extension is data of upper eight bits to be added to vbv_buffer_size_value of the sequence header. The low_delay is data indicating that no B-picture is included. The frame_rate_extension_n is data for obtaining a frame rate in combination with frame_rate_code of the sequence header. The frame_rate_extension_d is data for obtaining a frame rate in combination with frame_rate_code of the sequence header.

FIG. 13 illustrates the syntax of the extension_and_user_data(i) function. If "i" of this extension_and_user_data(i) function is not 2, only the data element defined by the user_data( ) function is described without describing the data element defined by the extension_data( ) function. Therefore, the extension_and_user_data(0) function describes only the data element defined by the user_data( ) function.

FIG. 14 illustrates the syntax of the group_of_picture_header( ) function. The data elements defined by the group_of_picture_header( ) function includes group_start_code, group_of_picture_header_present_flag, time_code, closed_gop, and broken_link.

The group_start_code is data indicating a start synchronizing code of the GOP layer. The group_of_picture_header_present_flag is data indicating whether the data element in group_of_picture_header is valid or invalid. The time_code is a time code indicating the time from the leading end of the sequence of the leading picture of the GOP. The closed_gop is flag data indicating that the picture in the GOP can be reproduced independently of the other GOP. The broken_link is flag data indicating that the leading B-picture in the GOP cannot be accurately reproduced for editing and the like.

The extension_and_user_data(1) function is a function for describing only the data element defined by the user_data( ) function, similarly to the extension_and_user_data(0) function.

With reference to FIGS. 15 to 17, the picture_header( ) function, picture_coding_extension( ) function, extension_and_user_data(2) function, and picture_data( ) function for describing the data elements related to the picture layer of the coded stream will now be described.

FIG. 15 illustrates the syntax of the picture_header( ) function. The data elements defined by this picture_header( ) function include picture_start_code, temporal_reference, picture_coding_type, vbv_delay, full_pel_forward_vector, forward_f_code, full_pel_backward_vector, backward_f_code, extra_bit_picture, and extra_information_picture.

Specifically, the picture_start_code is data expressing a start synchronizing code of the picture layer. The temporal_reference is data to be reset at the leading end of the GOP with a number indicating the display order of the picture. The picture_coding_type is data indicating the picture type.

The vbv_delay is data indicating the initial state of the VBV buffer and is set for each picture. The picture of the coded elementary stream transmitted from the transmitting side system to the receiving side system is buffered by the VBV buffer provided in the receiving side system. The picture is read out (read out) from the VBV buffer and supplied to the decoder at the time designated by DTS (Decoding Time Stamp). The time defined by vbv_delay is the time from when the picture of a decoding target starts being read out from the VBV buffer until the picture of a coding target is read out from the VBV buffer, that is, until the time designated by DTS. In the coded stream splicing device of the present invention, seamless splicing such that the data occupancy quantity in the VBV buffer does not become discontinuous is realized by using vbv_delay stored in the picture header. This feature will be later described in detail.

The full_pel_forward_vector is data indicating whether the precision of a forward motion vector is based on the integer unit or the half-pixel unit. The forward_f_code is data expressing the forward motion vector search range. The full_pel_backward_vector is data indicating whether the precision of a backward motion vector is based on the integer unit or the half-pixel unit. The backward_f_code is data expressing the backward motion vector search range. The extra_bit_picture is a flag indicating existence of subsequent additional information. If this extra_bit_picture is "1", extra_information_picture comes next. If this extra_bit_picture is "0", it is followed by no data. The extra_information_picture is information reserved in accordance with the standard.

FIG. 16 illustrates the syntax of the picture_coding_extension( ) function. The data elements defined by this picture_coding_extension( ) function include extension_start_code, extension_start_code_identifier, f_code[0][0], f_code[0][1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude, and sub_carrier_phase.

The extension_start_code is a start code indicating the start of extension data of the picture layer. The extension_start_code_identifier is a code indicating which extension data is to be transmitted. The f_code[0][0] is data expressing the search range of a forward horizontal motion vector. The f_code[0][1] is data expressing the search range of a forward vertical motion vector. The f_code[1][0] is data expressing the search range of a backward horizontal motion vector. The f_code[1][1] is data expressing the search range of a backward vertical motion vector. The intra_dc_precision is data expressing the precision of a DC coefficient. The picture_structure is data indicating whether the picture structure is a frame structure or a field structure. In the case of the field structure, it also indicates whether the field is an upper field or a lower field.

The top_field_first is a flag indicating whether the first field is a top field or a bottom field in the case of the frame structure. The frame_predictive_frame_dct is data indicating that prediction of frame mode DCT is only the frame mode in the case of the frame structure. The concealment_motion_vectors is data indicating that a motion vector for concealing a transmission error is provided in an intra-macroblock. The q_scale_type is data indicating whether a linear quantization scale or a non-linear quantization scale is used. The intra_vlc_format is data indicating whether another two-dimensional VLC is to be used for the intra-macroblock. The alternate_scan is data indicating selection as to whether to use zig-zag scan or alternate scan.

The repeat_first_field is a flag indicating whether or not a repeat field is to be generated at the time of decoding. In processing at the time of decoding, if this repeat_first_field is "1", a repeat field is generated. If this repeat_first_field is "0", a repeat field is not generated. The chroma_420_type is data indicating the same value as the next progressive_frame in the case where the signal format is 4:2:0, and indicating 0 in the case where the signal format is not 4:2:0. The progressive_frame is data indicating whether or not this picture is sequentially scanned. The composite_display_flag is data indicating whether a source signal is a composite signal or not. The v_axis is data used in the case where the source signal is of the PAL system. The field_sequence is data used in the case where the source signal is of the PAL system. The sub_carrier is data used in the case where the source signal is of the PAL system. The burst_amplitude is data used in the case where the source signal is of the PAL system. The sub_carrier_phase is data used in the case where the source signal is of the PAL system.

The extension_and_user_data(2) function describes the data element defined by the extension_data( ) function if the extension start code (extension_start_code) exists in the coded bit stream, as shown in FIG. 13. However, if the extension start code does not exist in the bit stream, the data element defined by the extension_data( ) function is not described in the bit stream. If the user data start code (user_data_start_code) exists in the bit stream, the data element defined by the user_data( ) function is described next to the data element defined by the extension_data( ) function.

FIG. 17 illustrates the syntax of the picture_data( ) function. The data element defined by this picture_data( ) function is a data element defined by a slice( ) function. However, if slice_start_code indicating the start code of the slice( ) function does not exist in the bit stream, the data element defined by the slice( ) function is not described in the bit stream.

The slice( ) function is a function for describing data elements related to the slice layer. Specifically, it is a function for describing data elements such as slice_start_code, slice_quantiser_scale_code, intra_slice_flag, intra_slice, reserved_bits, extra_bit_slice, extra_information_slice, and extra$_{bit}$_slice, and data elements defined by a macroblock( ) function.

The slice_start_code is the start code indicating the start of the data elements defined by the slice( ) function. The slice_quantiser_scale_code is data indicating the quantization step size set for a macroblock existing in this slice layer. However, if the quantiser_scale_code is set for each macroblock, data of macroblock_quantiser_scale_code set for each macroblock is used preferentially. The intra_slice_flag is a flag indicating whether or not intra_slice and reserved_bits exist in the bit stream. The intra_slice is data indicating whether or not a non-intra macroblock exists in the slice layer. If any one of the macroblocks in the slice layer is a non-intra macroblock, intra_slice is "0". If all the macroblocks in the slice layer are non-intra macroblocks, intra_slice is "1". The reserved_bits is 7-bit data and has a value "0". The extra_bit_slice is a flag indicating that additional information exists as a coded stream. If extra_information_slice exists next to extra_bit_slice, this flag is set at "1". If no additional information exists, the flag is set at "0".

The macroblock( ) function is a function for describing data elements related to the macroblock layer. Specifically, it is a function for describing data elements such as macroblock_escape, macroblock_address_increment, and macroblock_quantiser_scale_code, and data elements defined by a macroblock_mode( ) function and a macroblock_vectors(s) function.

The macroblock_escape is a fixed bit array indicating whether or not the horizontal difference between a reference macroblock and a previous macroblock is not less than 34. If the horizontal difference between the reference macroblock and the previous macroblock is not less than 34, 33 is added to the value of macroblock_address_increment. The macroblock_address_increment is data indicating the horizontal difference between the reference macroblock and the previous macroblock. If one macroblock_escape exists before this macroblock_address_increment, the value obtained by adding 33 to the value of macroblock_address_increment becomes data indicating the actual horizontal difference between the reference macroblock and the previous macroblock. The macroblock_quantiser_scale_code indicates the quantization step size set for each macroblock. In each slice layer, slice_quantiser_scale_code indicating the quantization step size of the slice layer is set. However, if macroblock_quantiser_scale_code is set for the reference macroblock, this quantization step size is selected.

Referring to FIGS. 18 and 19, the structure of the transport stream packet and the syntax of the transport stream packet will be described in detail.

The transport stream packet is constituted by a 4-byte header, and a 184-byte payload part for storing various data and data elements.

The header part of the transport stream packet includes various fields such as sync_byte, transport_error_indicator, payload_unit_start_indicator, transport_priority, PID, transport_scrambling_control, adaptation_field_control, continuity_counter, and adaptation_field.

The sync_byte is a fixed 8-bit field for detecting a synchronization pattern from the bit stream. Its value is defined by a fixed value of "01000111" (0×47). By detecting this bit pattern in the stream, synchronization can be detected.

The transport_error_indicator is a 1-bit flag. If this flag is set at "1", it indicates that an uncorrectable bit error of at least one bit exists in the transport stream packet.

The payload_unit_start_indicator is a 1-bit flag. It is data having prescriptive meanings for elementary data such as video/audio data or a transport stream packet for transmitting program specification information (PSI). If the payload of the transport stream packet includes elementary data, payload_unit_start_indicator has the following meanings. If payload_unit_start_indicator is "1", it indicates that elementary data is inserted at the beginning of the payload of the transport stream packet. If payload_unit_start_indicator is "0", elementary data is not inserted at the beginning of the payload of the transport stream packet. If payload_unit_start_indicator is set at "1", it indicates that the only one PES packet starts with an arbitrary transport stream packet. On the other hand, if the payload of the transport stream includes PSI data, payload_unit_start_indicator has the following meanings. If the transport packet transmits the first byte of the PSI section, payload_unit_start_indicator becomes "1". If the transport stream packet is not transmitting the first byte of the PSI section, payload_unit_start_indicator becomes "0". Also, if the transport stream packet is a null packet, payload_unit_start_indicator becomes "0".

The transport_priority is a 1-bit identifier indicating the priority of the transport packet. If transport_priority is set at "1", it indicates that this transport packet has priority over a packet having the same packet identifier PID and having transport_priority which is not "1". For example, by setting this packet identifier of transport_priority, priority can be given to an arbitrary packet in one elementary stream.

The transport_scrambling control is 2-bit data indicating the scrambling mode of the transport stream packet. The scrambling mode is a mode for indicating whether data stored in the payload part is scrambled or not and the type of scrambling. The transport stream packet header and the adaptation field are standardized not to be scrambled by a scramble key Ks. Thus, by this transport_scrambling_control, it can be determined whether data stored in the payload part of the transport stream packet is scrambled or not.

The adaptation_field_control is 2-bit data indicating that the adaptation field and/or the payload are arranged in the packet header of this transport stream packet. Specifically, if only the payload data is arranged in the packet header, this adaptation_field_control becomes "01". If only the adaptation field is arranged in the packet header, this adaptation_field_control becomes "10". If the adaptation field and the payload are arranged in the packet header, this adaptation_field_control becomes "11".

The continuity_counter is data indicating whether or not a part of packets having the same PID which are continuously transmitted is lost or dumped. Specifically, continuity_counter is a 4-bit field increasing for every transport stream packet having the same PID. However, when this continuity_counter is counted, the adaptation field is arranged in the packet header.

The adaptation_field( ) is a field for inserting additional information related to an individual stream or stuffing bytes as an option. By this adaptation field, all information related to dynamic changes of the state of an individual stream can be transmitted together with data.

FIG. 19 illustrates the syntax of adaptation_field( ). This adaptation_field( ) includes various fields such as adaptation_field_length, discontinuity_counter, random_access_indicator, elementary_stream_priority_indicator, OPCR_flag, splicing_point_flag, transport_private_data_flag, adaptation_field_extension flag, program_clock_reference (PCR), original_program_clock_reference (OPCR), splice_countdown, transport_private_data_length, private_data, adaptation_field_extension_length, ltw_flag (legal_time_window_flag), piecewise_rate_flag, and seamless_splice_flag.

The adaptation_field_length is data indicating the number of bytes of an adaptation field subsequent to this adaptation_field_length. If adaptation_field_control is "11", adaptation_field_length is 0 to 182 bits. If adaptation_field_control is "10", adaptation_field_length is 183 bits. Meanwhile, if the elementary stream enough to fill the payload of the transport stream does not exist, stuffing processing for filling bits is required.

The discontinuity counter is data indicating whether or not a system clock reference (SCR) is reset in a halfway portion of plural packets having the same PID and therefore has become discontinuous. If the system clock reference is discontinuous, this discontinuity_counter is "1". If the system clock reference is continuous, this discontinuity_counter is "0". The system clock reference is reference information for setting the value of the system time clock on the decoder side at the timing intended on the encoder side, in the MPEG decoder for decoding video and audio data.

The random_access_indicator is data indicating the start of a video sequence header or an audio frame. In short, this random_access_indicator is data indicating a video or audio access point (the start of a frame) in carrying out random access to the data elements.

The elementary_stream_priority_indicator is data indicating priority of elementary stream data to be transmitted in the payload of this transport stream packet, with respect to packets having the same PID. For example, if the elementary stream includes video data which is intra-coded, elementary_stream_priority_indicator is set at "1". On the contrary, elementary_stream_priority_indicator of the transport stream including inter-coded video data is set at "0".

The PCR_flag is data indicating whether or not PCR (program_clock_reference) data exists in the adaptation field. If PCR data exists in the adaptation field, PCR_flag is set at "1". If PCR data does not exist in the adaptation field, PCR_flag is set at "0". This PCR data is data used for obtaining timing of decoding processing of transmitted data in the decoder of the receiving unit.

The OPCR_flag is data indicating whether or not OPCR (original_program_clock_reference) data exists in the adaptation field. If OPCR data exists in the adaptation field, OPCR_flag is set at "1". If OPCR data does not exist in the adaptation field, OPCR_flag is set at "0". This OPCR data is data used when one transport stream is reconstructed from a plurality of original transport streams by splicing processing. The OPCR data is data expressing PCR data of a certain original transport stream.

The splicing_point_flag is data indicating whether or not splice_countdown for indicating an edit point (splicing point) at the transport level exists in the adaptation field. If splice_countdown exists in the adaptation field, this splicing_point_flag is "1". If splice_countdown does not exist in the adaptation field, this splicing_point_flag is "0".

The transport_private_data_flag is data indicating whether or not private data for describing arbitrary user data exists in the adaptation field. If private data exists in the adaptation field, this transport_private_data_flag is set at "1". If no private data exists in the adaptation field, this transport_private_data_flag is set at "0".

The adaptation_field_extension flag is data indicating whether or not an extension field exists in the adaptation field. If an extension field exists in the adaptation field, this adaptation_field_extension_flag is set at "1". If no extension field exists in the adaptation field, this adaptation_field_extension_flag is set at "0".

The program_clock_reference (PCR) is a reference clock which is referred to for synchronizing the phase of the clock on the receiving side with the phase of the clock on the transmitting side. This PCR data stores the time when the transport packet is generated. The PCR data consists of 33-bit program_clock_reference_base and 9-bit program_clock_reference_extension, that is, 42 bits in total. The system clock is counted from 0 to 299 by program_clock_reference_extension, and one bit is added to program_clock_reference_base by a carrier in resetting from 299 to 0. Thus, 24 hours can be counted.

The original_program_clock_reference (OPCR) is data used for reconstructing a transport stream of a single program from a certain transport stream. If a single program transport stream is completely reconstructed, this original_program_clock_reference is copied to program_clock_reference.

The splice_countdown is data indicating the number of packets up to a point where editing (splicing processing) can be carried out at the transport stream packet level, with respect to transport stream packets having the same PID. Therefore, in a transport stream packet at a splicing point where editing can be carried out, splice_countdown is "0". In the transport packet having splice-countdown of "0", splicing processing can be carried out by causing the last byte of the transport stream packet payload to be the last byte of the coded picture.

This splicing processing is processing for connecting two different elementary streams at the transport level, thus generating one new transport stream. Splicing processing can be classified into seamless splicing which does not generate discontinuity of codes, and non-seamless splicing which generates discontinuity of codes. "Not generating discontinuity of codes" means absence of contradiction between the decoding time of an access unit of a newly connected subsequent stream and the decoding time of an access unit of an old stream before splicing. "Generating discontinuity of codes" means generation of contradiction between the decoding time of an access unit of a newly connected subsequent stream and the decoding time of an access unit of an old stream before splicing.

The transport_private_data_length is data indicating the number of bytes of private data in the adaptation field.

The private_data is a field which is not particularly prescribed by the standard and can describe arbitrary user data in the adaptation field.

The adaptation_field_extension_length is data indicating the data length of adaptation field extension in the adaptation field.

The ltw_flag (legal_time_window_flag) is data indicating whether or not ltw_offset indicating the offset value of a display window exists in the adaptation field.

The piecewise_rate_flag is data indicating whether or not piecewise_rate exists in the adaptation field.

The seamless_splice_flag is data indicating whether the splicing point a normal splicing point or a seamless splicing point. If this seamless_splice_flag is "0", it indicates that the splicing point is a normal splicing point. If this seamless_splice_flag is "1", it indicates that the splicing point is a seamless splicing point. The normal splicing point exists at the end of the PES packet. The splicing packet immediately before this splicing point ends with an access unit, and a transport packet having the same PID starts at the header of the PES packet. On the contrary, the seamless splicing point exists at a halfway point in the PES packet. To prevent contradiction between the decoding time of an access unit of a newly connected subsequent stream and the decoding time of an access unit of an old stream before splicing, a part of characteristics of the old stream is used as characteristics of the new stream.

Splicing processing for splicing a stream $ST_{OLD}$ transmitted from the key station 30 and a stream $ST_{NEW}$ generated at the local station 40 will now be described with reference to FIGS. 20 to 23.

Figure 20:
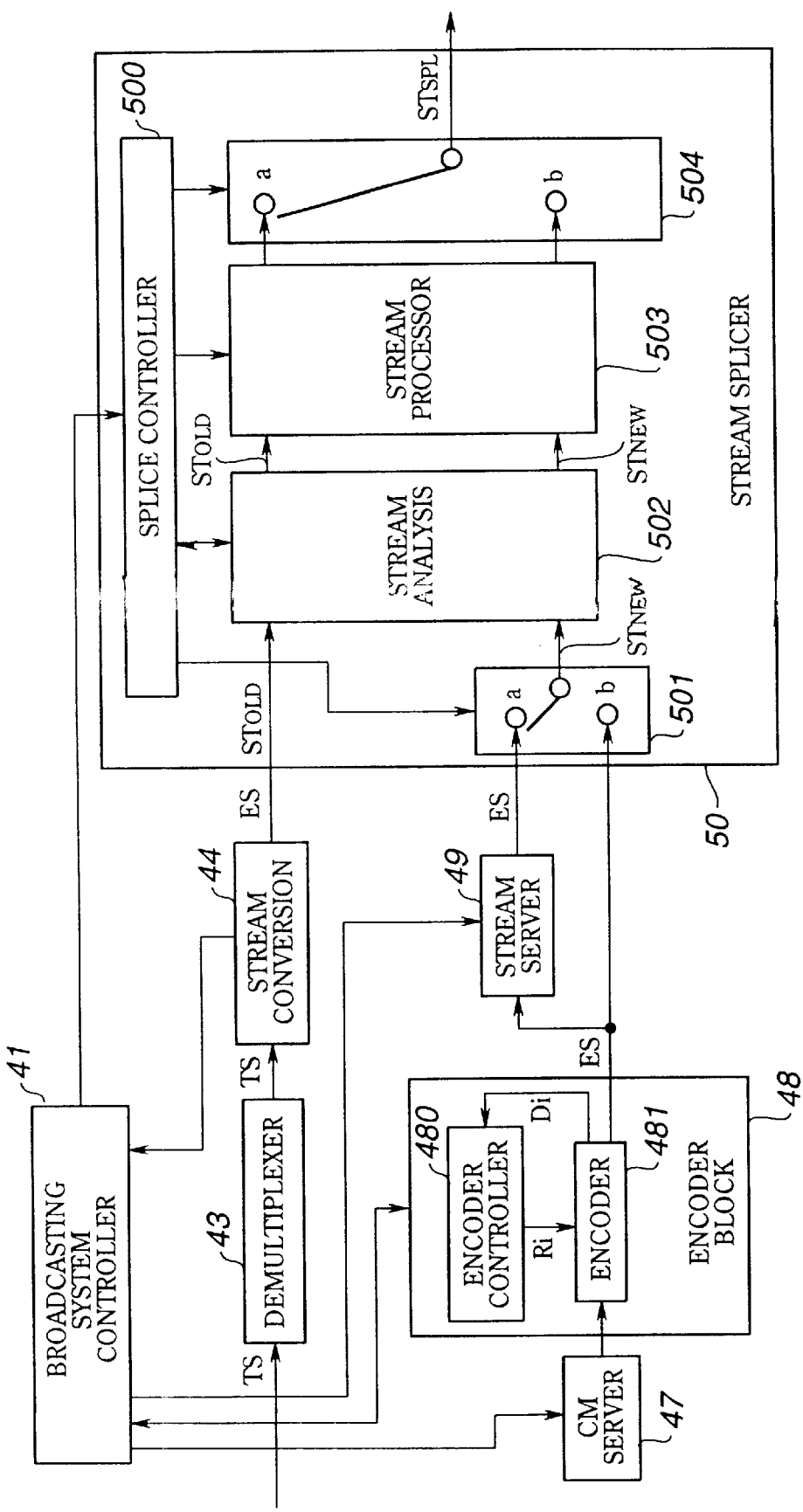
FIG. 20 is a block diagram showing a simplified structure of a local station and the structure of a stream splicer in accordance with the invention.

In FIG. 20, only one channel of plural channels is shown and the other channels are omitted, in order to clarify the control of the local station 40 described with in FIG. 7. In the present invention, there are provided three embodiments of splicing processing. First, second, and third embodiments of splicing processing will now be described sequentially.

In the first embodiment of splicing processing, splicing processing is carried out in the case where a coded stream $ST_{NEW}$ of the commercial CM' to be newly inserted is already generated before a coded stream $ST_{OLD}$ of the transmission program is transmitted from the key station 30. That is, the stream of the commercial CM1' which has been coded in advance is inserted to the coded stream $ST_{OLD}$ of the commercial CM of the transmission program. Normally, a commercial is repeatedly broadcast for a number of times. Therefore, it is not efficient to encode the video data of the commercial every time it is broadcast. Thus, the video data of the local commercial CM1' is coded, and the coded stream $ST_{NEW}$ thereof is stored in the stream server 49. Then, when the coded stream $ST_{OLD}$ of the commercial CM1 to be replaced is transmitted from the key station 30, the coded stream $ST_{NEW}$ of the local commercial CM1' is reproduced from the stream server 49, thereby omitting the processing for repeatedly coding the same commercial for a number of times. In such case, the first splicing processing is carried out as will be described in detail hereinafter.

First, initial processing at the local station 40 for coding the local commercial CM1' to replace the commercial CM1 of the transmission program and storing the coded stream $ST_{NEW}$ into the stream server 49 will be described. The broadcasting system controller 41 controls the CM server 47 to reproduce the video data of the commercial CM1' to replace the commercial CM1 of the transmission program. Then, an encoder 481 receives the base band video data reproduced from the CM server 47, and supplies the coding difficulty Di of each picture of this video data to an encoder controller 480. The encoder controller 480, similar to the encoder controller 350 described in FIG. 8, supplies a target bit rate Ri to the encoder 481 so that the encoder 481 generates appropriate coded bits. The encoder 481 carries out coding processing based on the target bit rate Ri supplied from the encoder controller 480, and thus can generate the coded elementary stream $ST_{NEW}$ of the optimum bit rate. The coded elementary stream $ST_{NEW}$ outputted from the encoder 481 is supplied to the stream server 49. The stream server 49 records the coded elementary stream in the state of stream into a randomly accessible recording medium. Thus, initial processing for storing the coded stream $ST_{NEW}$ into the stream server 49 is completed.

Next, splicing processing for splicing the coded stream $ST_{OLD}$ of the transmission program transmitted from the key station and the coded stream $ST_{NEW}$ stored in the stream server 49 by the above-described initial processing will be described.

The coded stream $ST_{OLD}$ transmitted from the key station 30 is converted from the form of transport stream to the form of elementary stream by the stream conversion circuit 44. The coded stream $ST_{OLD}$ converted to the form of elementary stream is supplied to the stream splicer 50.

The stream splicer 50 includes a splice controller 500, a switch circuit 501, a stream analysis circuit 502, a stream processor 503, and a splicing circuit 504, as shown in FIG. 20.

In the first embodiment of splicing processing, the splice controller 500 switches an input terminal of the switch circuit 501 to "a" so as to supply the elementary stream $ST_{NEW}$ supplied from the stream server 49 to the stream analysis circuit 502.

The stream analysis circuit 502 is a circuit for parsing and analyzing the syntax of the coded stream $ST_{OLD}$ and the coded stream $ST_{NEW}$. Specifically, the stream analysis circuit 502 searches for 32-bit picture_start_code described in the coded stream $ST_{OLD}$, thereby learning the place in the stream where information related to the picture header is described, as understood from the syntax of the coded stream shown in FIGS. 10 and 15. Then, the stream analysis circuit 502 finds 3-bit picture_coding_type, which starts 11 bits after picture_start_code, thereby learning the picture type. Also, the stream analysis circuit 502 learns vbv_delay of the coded picture from 16-bit vbv_delay described next to this 3-bit picture_coding_type.

Moreover, the stream analysis circuit 502 searches for 32-bit extension_start_code described in the coded stream $ST_{OLD}$ and the coded stream $ST_{NEW}$, thereby learning the place in the stream where information related to picture coding extension is described, as understood from the syntax of the coded stream shown in FIGS. 10 and 15. Then, the stream analysis circuit 502 searches for 1-bit top_field_first, which is described 25 bits after picture_start_code, and repeat_first_field, which is described 6 bits after that top_field_first, thereby learning the frame structure of the coded picture. For example, if "top_field_first" of the coded picture is "1", it indicates a frame structure in which the top field is temporally earlier than the bottom field. If "top_field_first" is "0", it indicates a frame structure in which the top field is temporally later than the bottom field. If the flag "top_field_first" in the coded stream is "1" and "repeat_first_field" is "1", it indicates a picture structure such that the repeat field is generated from the top field at the time of decoding. If the flag "top_field_first" in the coded stream is "0" and "repeat_first_field" is "1", it indicates the picture structure such that the repeat field is generated from the bottom field at the time of decoding.

The above-described picture_coding_type, vbv_delay, top_field_first, and repeat_first_field are extracted from the coded stream for each picture, and are supplied to the splice controller 500. The elementary stream $ST_{OLD}$ and the elementary stream $ST_{NEW}$ supplied to the stream analysis circuit 502 are directly supplied to the stream processor 503 as the elementary stream $ST_{OLD}$ and the elementary stream $ST_{NEW}$.

In addition, the stream analysis circuit 502 has a counter for counting the number of bits of the supplied stream $ST_{OLD}$ and stream $ST_{NEW}$. On the basis of the count value and the quantity of generated bits of each picture, the stream analysis circuit 502 simulates the data remaining quantity in the VBV buffer with respect to each picture. The data remaining quantity in the VBV buffer with respect to each picture, calculated by the stream analysis circuit 502, is also supplied to the splice controller 500.

The stream processor 503 is a circuit for changing the coding parameters, the data elements and the flags of the stream $ST_{OLD}$ and the stream $ST_{NEW}$ so that a spliced stream ST_SPL generated by splicing the stream $ST_{OLD}$ and the stream $ST_{NEW}$ becomes a seamless stream. Specific processing carried out by the stream processor 503 will now be described with reference to FIGS. 21A to 21B.

Figure 21A:
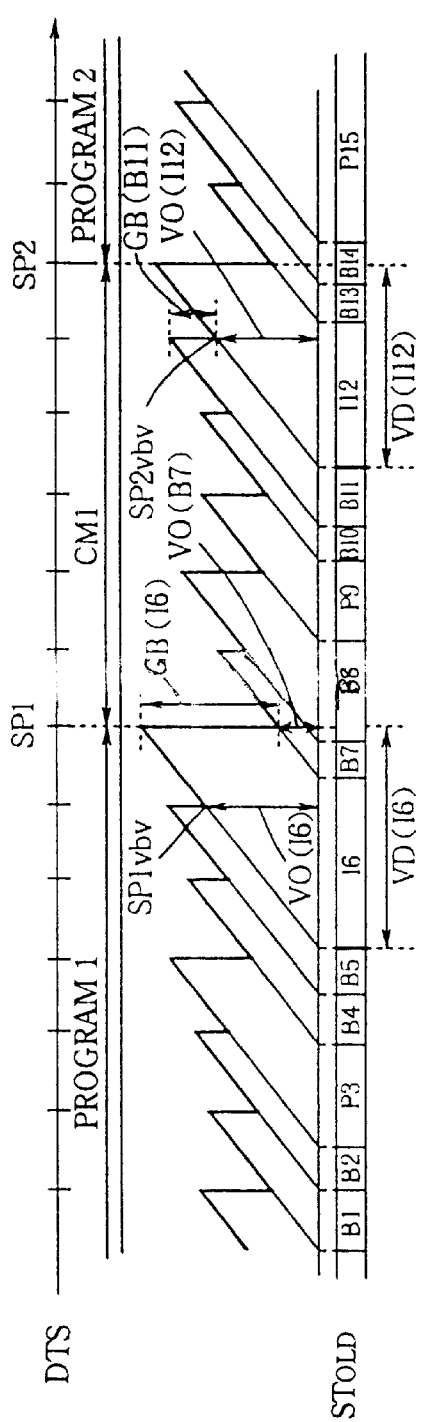
FIGS. 21A to 21C illustrate the data occupancy of a VBV buffer of the stream splicer during editing processing.
Figure 21B:
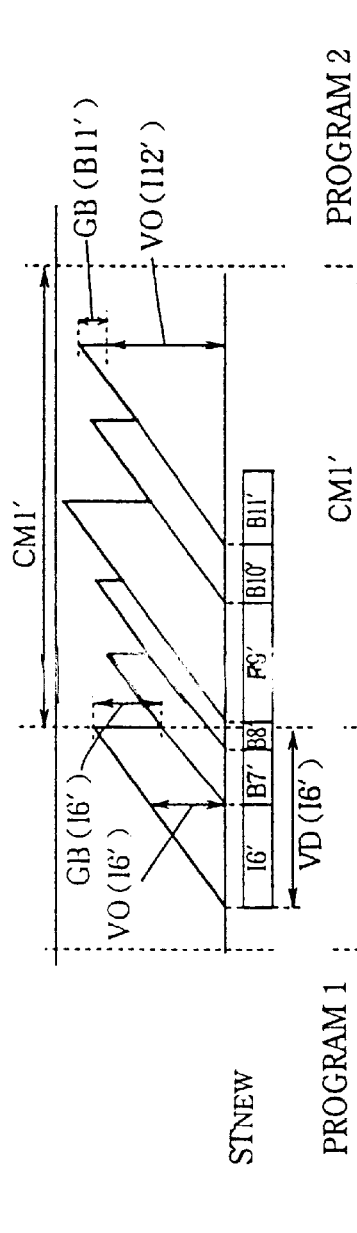
Figure 21C:
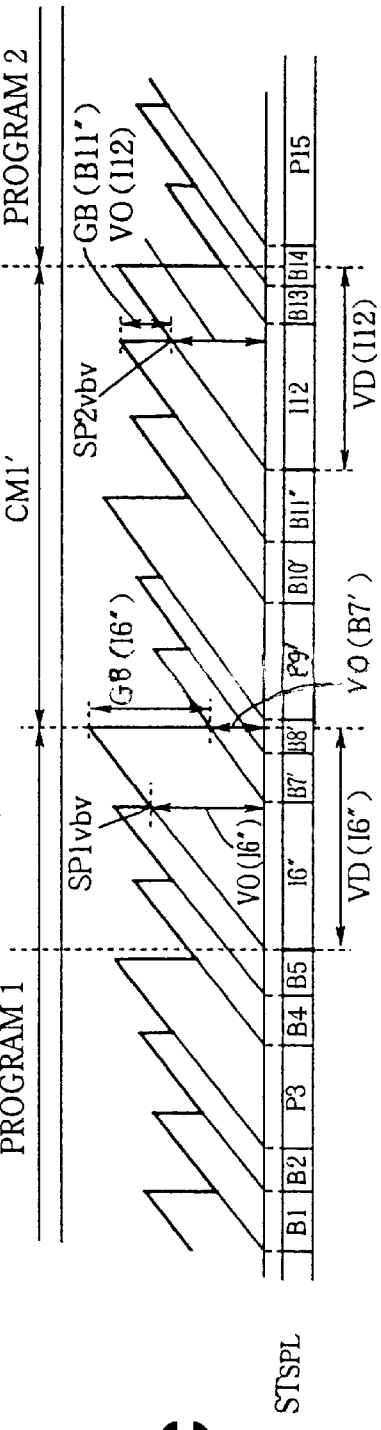

FIG. 21A shows the original stream $ST_{OLD}$ supplied from the key station 30 and the locus of the data occupancy quantity of the stream $ST_{OLD}$ in the VBV buffer. FIG. 21B shows the substitute stream $ST_{NEW}$ stored in the stream server 49 and the locus of the data occupancy quantity of the stream $ST_{NEW}$ in the VBV buffer. FIG. 21C shows the spliced stream $ST_{SPL}$ obtained by splicing the stream $ST_{OLD}$ and the stream $ST_{NEW}$ at splicing points SP1 and SP2, and the locus of the data occupancy quantity of the spliced stream $ST_{SPL}$ in the VBV buffer. In FIG. 21A, DTS (decoding time stamp) is shown. SP1vbv indicates the first splicing point on the locus of the data occupancy quantity in the VBV buffer. SP2vbv indicates the second splicing point on the locus of the data occupancy quantity in the VBV buffer. VO(I6) indicates the data quantity of a picture I6 buffered on the VBV buffer when a picture B5 is read out from the VBV buffer. GB(I6) indicated the quantity of generated bits of the picture 16. VD(I6) indicates the value of vbv_delay of the picture 16. VO(B7) indicates the data quantity of a picture B7 buffered on the VBV buffer when the picture I6 is read out from the VBV buffer. GB(B11) indicates the quantity of generated bits of a picture B11. VD(I12) indicates the value of vbv_delay of a picture 112. VO(I12) indicates the data quantity of the picture I12 buffered on the VBV buffer when the picture B11 is read out from the VBV buffer. In FIG. 21B, GB(I6') indicates the quantity of generated bits of a picture I6'. VD(I6') indicates the value of vbv_delay of the picture I6'. VO(I6') indicates the data quantity of the picture I6' buffered on the VBV buffer at the first splicing point SP1vbv in the VBV buffer. GB(B11') indicates the quantity of generated bits of a picture B11'. VO(I12') indicates the data quantity of a picture B12' buffered on the VBV buffer at the second splicing point SP2vbv in the VBV buffer. In FIG. 21C, GB(I6") indicates the quantity of generated bits of a picture I6" which is processed so that the spliced stream $ST_{SPL}$ becomes a seamless stream. VD(I6") indicates the value of vbv_delay of the picture 16". GB(B11") indicates the quantity of generated bits of a picture B11" which is processed so that the spliced stream $ST_{SPL}$ becomes a seamless stream.

The original stream $ST_{OLD}$ is a stream coded at the key station 30, and the substitute stream $ST_{NEW}$ is a stream coded at the local station 40. Therefore, the stream $ST_{OLD}$ and the stream $ST_{NEW}$ are streams separately coded by their respective video encoders. That is, the value VD(I6) of vbv_delay of the first picture I6 in the stream $ST_{OLD}$ and the value VD(I6') of vbv_delay of the first picture I6' in the stream $ST_{NEW}$ are not the same value. In such case, the data occupancy quantity VO(I6) of the original stream $ST_{OLD}$ in the VBV buffer and the data occupancy quantity VO(I6') of the substitute stream $ST_{NEW}$ in the VBV buffer are different from each other, at the timing of the stream splicing point SP1 vbv in the VBV buffer.

As described in the background art of the present invention, if the stream $ST_{OLD}$ and the stream $ST_{NEW}$ are spliced simplistically at the splicing point SP1, the data occupancy quantity of the simplistically spliced stream in the VBV buffer becomes discontinuous or generates overflow/underflow.

Thus, in the stream splicer 50, the stream processor 503 carries out stream processing with respect to the stream structure of the supplied stream $ST_{OLD}$ and stream $ST_{NEW}$ so that the spliced stream $ST_{SPL}$ becomes seamless at the splicing point, on the basis of the data elements extracted from the stream $ST_{OLD}$ and the stream $ST_{NEW}$ by the stream analysis circuit 502. This processing will be described hereinafter.

The splice controller 500 receives from the stream analysis circuit 502 information such as picture_coding_type, vbv_delay, top_field_first and repeat_first_field for each picture, the quantity of generated bits in each picture, and the data occupancy quantity in the VBV buffer with respect to each picture, as the data elements related to the stream $ST_{OLD}$. In FIGS. 21A to 21C, the value of vbv_delay of the picture I6 is expressed as VD(I6), and the quantity of generated bits of the picture I6 is expressed as GB(I6). The data occupancy quantity of the picture I6 in the VBV buffer is expressed as VO(I6).

Next, processing carried out by the splice controller 500 and the stream processor 503 with respect to the VBV buffer at the splicing point SPI will be described.

First, if the splice controller 500 has determined that value VD(I6) of vbv_delay of the picture I6 of the original stream $ST_{OLD}$ and the value VD(I6') of vbv_delay of the picture I6' of the substitute stream $ST_{NEW}$ at the splicing point SP1 are different from each other, the splice controller 500 instructs the stream processor 503 to rewrite the value of vbv_delay of the picture I6' described in the substitute stream $ST_{NEW}$ from VD(I6') to VD(I6).

In accordance with the instruction from the splice controller 500, the stream processor 503 rewrites the value of vbv_delay of 16 bits described in the picture header of the substitute stream $ST_{NEW}$ from VD(I6') to VD(I6).

In this case, if the value of vbv_delay in the substitute stream $ST_{NEW}$ is simply rewritten from VD(I6') to VD(I6) so as to read out a bit stream from the VBV buffer in accordance with the rewritten vbv_delay, the quantity of generated bits of the picture I6' is insufficient, causing the locus of the VBV buffer following the splicing point to shift upward and thereby causing overflow of the VBV buffer. Thus, the splice controller 500 carries out processing for inserting one or more stuffing bytes into the picture I6' of the substitute stream $ST_{NEW}$ so that the quantity of generated bits GB(I6') of the picture I6' of the substitute stream $ST_{NEW}$ becomes the quantity of generated bits GB(I6") of the picture I6" of the seamless spliced stream $ST_{SPL}$. The stuffing byte(s) is data consisting of dummy bits "0".

To carry out processing for inserting the stuffing byte(s), the splice controller 500 calculates the data quantity of the stuffing byte(s) that should be inserted, by using the quantity of generated bits GB(I6) and the data occupancy quantity VO(I6) in the VBV buffer received as information related to the picture I6 and the picture B7 in the stream $ST_{OLD}$ and the quantity of generated bits GB(I6') and the data occupancy quantity VO(I6') in the VBV buffer received as information related to the picture I6' in the stream $ST_{NEW}$. Specifically, the number of stuffing bytes SB1 [byte] is calculated on the basis of the following equation (2).

$$SB1 \text{ [byte]} = \{GB(I6'') - GB(I6')\}/8 \qquad (2)$$
$$= \{GB(I6) - GB(I6') + VO(B7) - VO(B7')\}/8$$

The splice controller 500 controls the stream processor 503 to insert the number of stuffing bytes SB1 calculated in accordance with the equation (2) into the stream $ST_{NEW}$.

In accordance with the command from the splice controller 500, the stream processor 503 inserts the number of stuffing bytes SB1 into the stream $ST_{NEW}$. As a position where the stuffing bytes should be inserted in the stream, a position before the start code of the picture header of the picture I6 in the coded stream $ST_{NEW}$ is most desired, but a position before another start code may also be used.

The above-described processing is the control carried out by the splice controller 500 and the stream processor 503 with respect to the VBV buffer at the splice point SP1.

Next, control carried out by the splice controller 500 and the stream processor 503 with respect to the VBV buffer at the splicing point SP2 will be described.

If the stream $ST_{NEW}$ and the stream $ST_{OLD}$ are simplistically spliced at the splicing point SP2, the quantity of generated bits GB(B11') of the last picture I11' of the stream $ST_{NEW}$ is insufficient and therefore is not continuous with the locus of the data occupancy quantity in the VBV buffer with respect to the first picture I12 of the stream $ST_{NEW}$. As a result, underflow or overflow of the VBV buffer is generated.

Thus, the splice controller 500 carries out processing for inserting one or more stuffing bytes into the stream $ST_{NEW}$ so that the quantity of generated bits GB(I11') of the last picture I11' of the stream $ST_{NEW}$ becomes the quantity of generated bits GB(I11'') of the picture I11' of FIG. 21C so as to realize a continuous locus of the VBV buffer at the splice point SP2 vbv in the VBV buffer.

To carry out processing for inserting the stuffing byte(s), the splice controller 500 calculates the data quantity of the stuffing byte(s) that should be inserted, by using VO(I12) received as information related to the picture I12 in the stream $ST_{OLD}$, the quantity of generated bits GB(B11') of the last picture B11' of the stream $ST_{NEW}$, and the data occupancy quantity VO(I12') in the VBV buffer with respect to the picture I12' of the stream $ST_{NEW}$. Specifically, the number of stuffing bytes SB2 [byte] is calculated on the basis of the following equation (3).

$$SB2 \text{ [byte]} = \{GB(B11'') - GB(B11')\}/8 \qquad (3)$$
$$= \{VO(I12') - VO(I12)\}/8$$

In other words, the data occupancy quantity VO(I12') is the data occupancy quantity in the VBV buffer with respect to the stream $ST_{NEW}$ after the last picture B11' is read out from the VBV buffer. This data occupancy quantity VO(I12') can be easily detected by the stream analysis circuit 502 which has grasped the locus of VBV by counting the number of bits of the stream $ST_{NEW}$.

The splice controller 500 controls the stream processor 503 to insert the number of stuffing bytes SB2 calculated in accordance with the equation (3) into the stream $ST_{NEW}$.

In accordance with the command from the splice controller 500, the stream processor 503 inserts the number of stuffing bytes SB2 as information related to the picture B11' of the stream $ST_{NEW}$. As a position where the stuffing byte(s) should be inserted in the stream, a position before the start code of the picture header of the picture B11' in the coded stream $ST_{NEW}$ is most desired.

The above-described processing is the control carried out by the splice controller 500 and the stream processor 503 with respect to the VBV buffer at the splice point SP2.

Figure 22A:
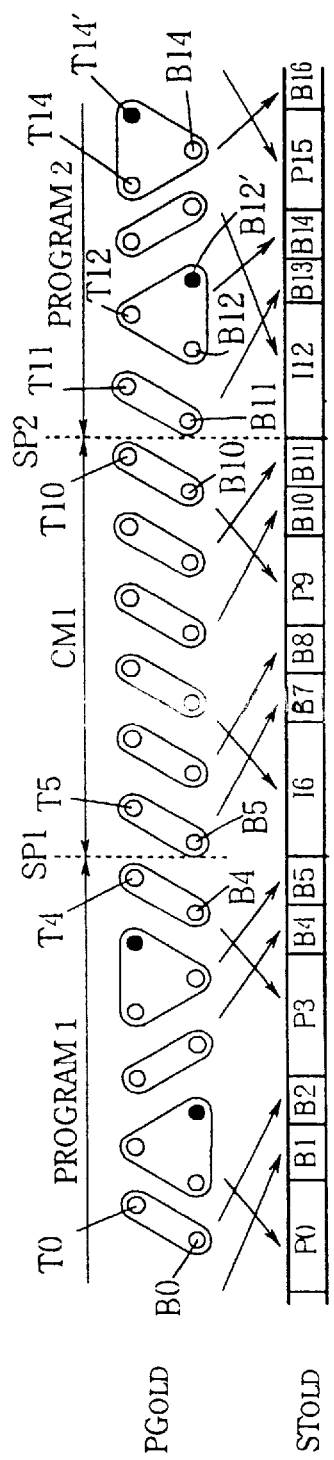
FIGS. 22A to 22C illustrate a first processing example related to "top_field_first" and "repeat_first_field" of the stream splicer.
Figure 22B:
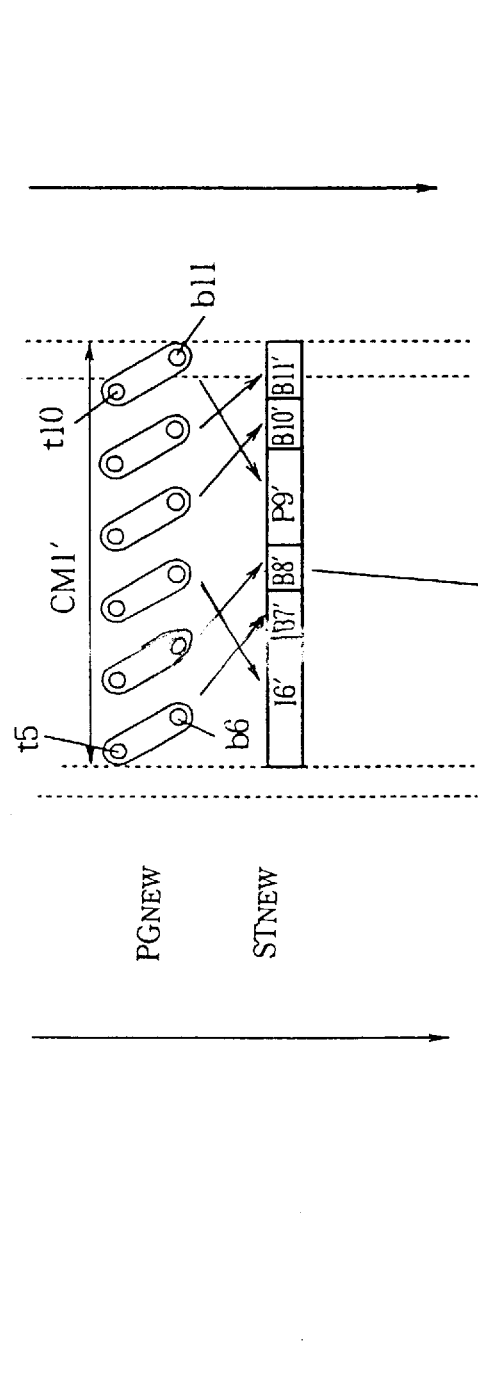
Figure 22C:
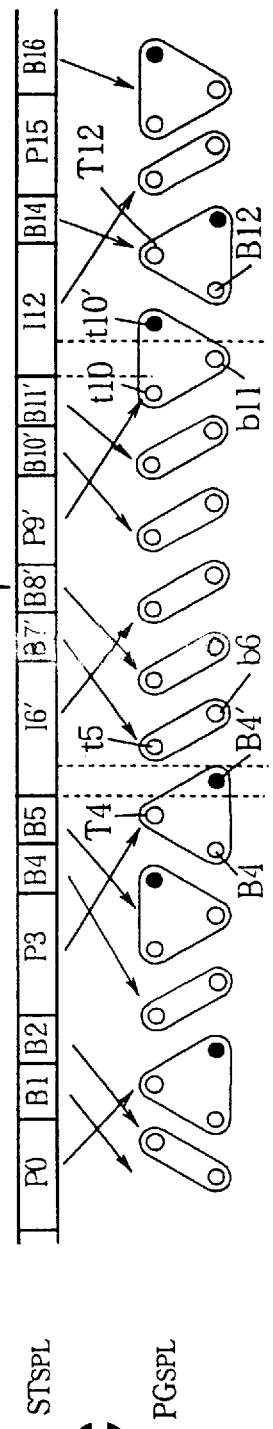

With reference to FIGS. 22A to 22C, a first example of processing with respect to the flags such as top_field_first and repeat_first_field by the splice controller 500 and the stream processor 503 at the splicing point SP1 will now be described.

FIG. 22A shows the frame structure of a television program $PG_{OLD}$ constituted by a program 1, a commercial CM1 and a program 2 produced at the key station 30, and a coded stream $ST_{OLD}$ obtained by coding the television program $PG_{OLD}$. FIG. 22 shows the frame structure of a substitute commercial CM1' produced at the local station 40, and a coded stream $ST_{NEW}$ obtained by coding the substitute commercial CM1'. FIG. 22C shows a spliced stream $ST_{SPL}$ generated by splicing the original stream $ST_{OLD}$ and the substitute stream $ST_{NEW}$, and the frame structure obtained by decoding the spliced stream $ST_{SPL}$.

Figure 6A:
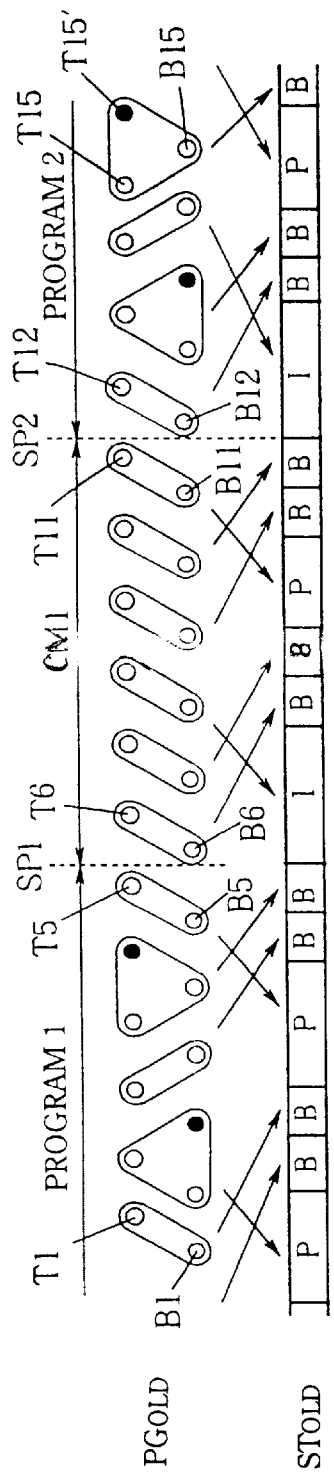
FIGS. 6A to 6C illustrate problems generated in splicing a coded stream.
Figure 6B:
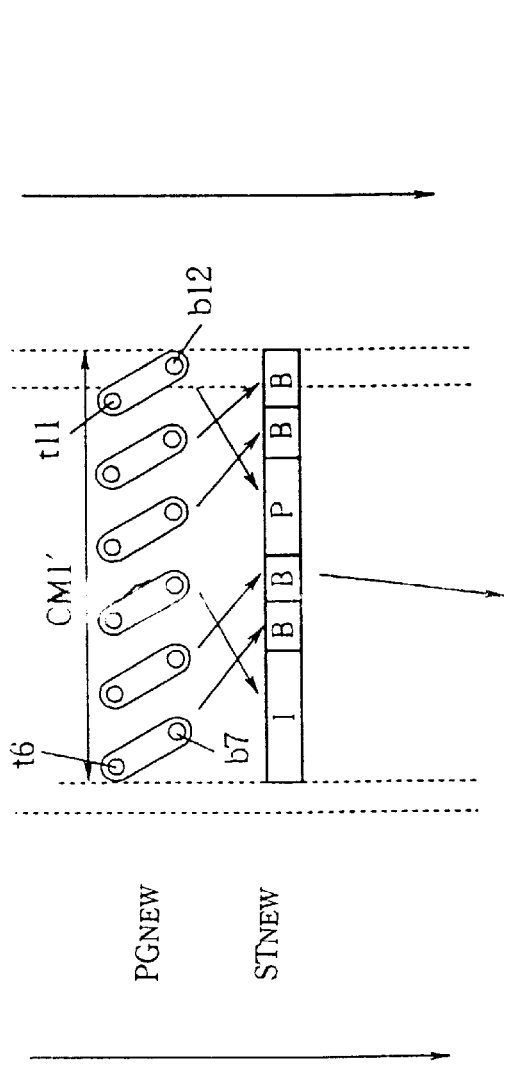
Figure 6C:
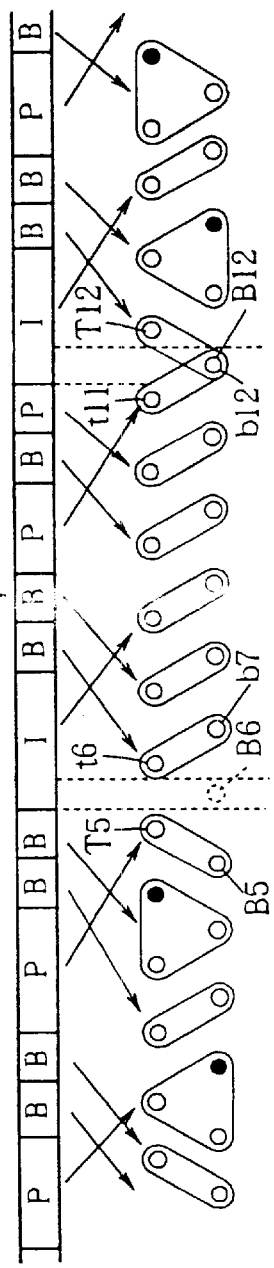

The splice controller 500 compares the top_field_first of each picture of the commercial CM1 in the stream $ST_{OLD}$ supplied from the stream analysis circuit 502 with top_field_first of the commercial CM1' in the substitute stream $ST_{NEW}$. If top field first of the stream $ST_{OLD}$ and top field_first of the substitute stream $ST_{NEW}$ coincide with each other, the same field structure is employed and therefore processing with respect to the flags such as top_field_first and repeat_first_field is not necessary. However, if top_field_first of the original commercial CM1 is "0" and top_field_first of the substitute commercial CM1' is "1" as shown in FIGS. 22A to 22C, problems of discontinuity and duplication of fields as described in FIG. 6 are generated.

Thus, the stream splicer 50 of the present invention rewrites top_field_first and repeat_first_field of the pictures near the splicing point so as not to generate a stream unconformable to the MPEG standard in which field dropping or overlapping is generated by splicing processing.

In the example shown in FIGS. 22A to 22C, the splice controller 500 controls the stream processor 503 to rewrite repeat_first_field of a picture P3 having a frame constituted by a top field T4 and a bottom field B4, from 0 to 1. In addition, the splice controller 500 controls the stream processor 503 to rewrite repeat_first_field of a picture P9' having a frame constituted by a top field t10 and a bottom field b11, from 0 to 1, so as to generate a stream seamless at the splicing point SP2. Also, since the commercial CM1' is shifted by the time of one frame from the original commercial CM1 by rewriting repeat_first_field of the picture P9', the splice controller 500 controls the stream processor 503 to delete from the stream $ST_{OLD}$ a picture B13 displayed first of all pictures of the program 2 on the display.

In accordance with the instruction from the splice controller 500, the stream processor 503 searches the original stream $ST_{OLD}$ for the start code of picture_coding_extension related to the picture P3, and rewrites the value of repeat_first_field therein from 0 to 1. Thus, since a repeat field B4' is generated by decoding the picture P3 having the value of repeat_first_field rewritten, the fields become continuous at the splicing point SP1. Similarly, the stream processor 503 searches the substitute stream $ST_{NEW}$ for the start code of picture_coding_extension related to the picture P9', and rewrites the value of repeat_first_field therein from 0 to 1. Thus, since a repeat field t10' is generated by decoding the picture P9' having the value of repeat_first_field rewritten, the fields become continuous at the splicing point SP2. Also, the stream processor 503 deletes a portion where the data element related to the picture B13 is described in the original stream $ST_{OLD}$, or replaces the portion with null data.

Figure 23A:
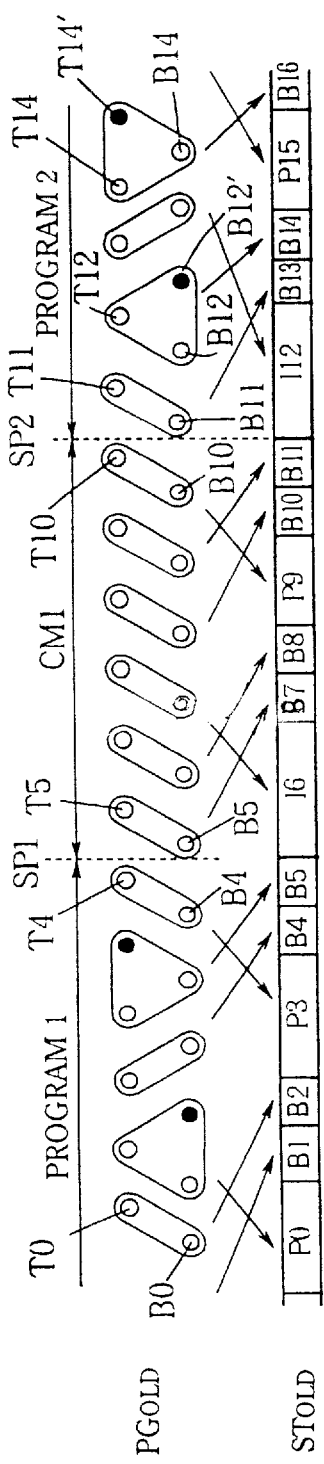
FIGS. 23A to 23C illustrates a second processing example related to "top_field_first" and "repeat_first_field" of the stream splicer.
Figure 23B:
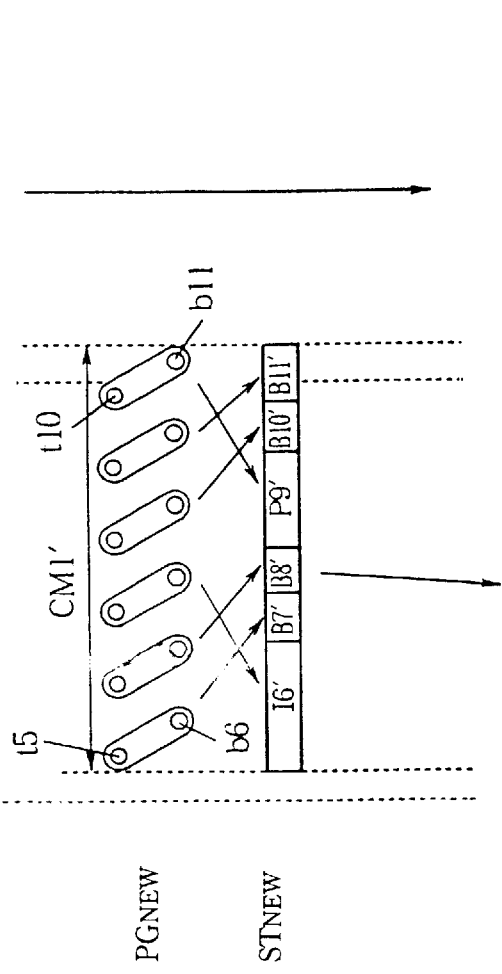
Figure 23C:
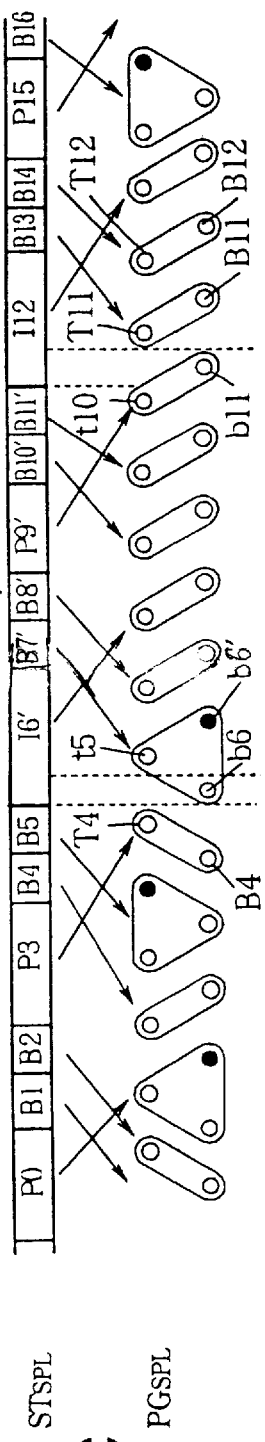

FIGS. 23A to 23C show another example of the processing with respect to the flags such as top_field_first and repeat_first_field described in FIGS. 22A to 22C. With reference to FIGS. 23A to 23C, a second example of processing with respect to the flags such as top_field_first and repeat_first_field by the splice controller 500 and the stream processor 503 at the splicing points SP1 and SP2 will now be described.

In the example shown in FIGS. 23A to 23C, the splice controller 500 controls the stream processor 503 to rewrite top_field_first of a picture B7' constituted by a top field t5 and a bottom field b6 from 1 to 0 and to rewrite repeat_first_field of the picture B7' from 0 to 1 so that fields at the seam between the program 1 and the commercial CM1' at the splicing point SP1 become continuous. In addition, the splice controller 500 controls the stream processor 503 to rewrite top_field_first of a picture B13 constituted by a top field T11 and a bottom field B11 from 0 to 1 so that fields at the seam between the commercial CM1' and the program 2 at the splicing point SP2 become continuous. Moreover, the splice controller 500 controls the stream processor 503 to rewrite top_field_first of a picture B14 constituted by a top field T12 and a bottom field B12 from 1 to 0 and to rewrite repeat_first_field from 1 to 0.

Under the control of the splice controller 500, the stream processor 503 searches the substitute stream $ST_{NEW}$ for the start code of picture_coding_extension related to the picture B7'. The stream processor 503 then rewrites top_field_first in the stream from 1 to 0 and rewrites repeat_first_field from 0 to 1. Thus, by decoding the picture B7' having the values of top_field_first and repeat_first_field rewritten, the display time of the bottom field b6 is shifted by one frame and a repeat field b6' is generated. Therefore, the fields become continuous at the splicing point SP1. Similarly, the stream processor 503 searches the original stream $ST_{OLD}$ for the start code of picture_coding_extension related to the picture B13, and rewrites top_field_first therein from 1 to 0. In addition, the stream processor 503 rewrites top_field_first related to the picture B14 in the original stream $ST_{OLD}$, from 1 to 0, and rewrites repeat_first_field from 1 to 0. Thus, since the display time of the bottom fields B11 and B12 is shifted by one frame by decoding the pictures B13 and B14 having the values of top_field_first and repeat_first_field rewritten, the fields become continuous at the splicing point SP2.

The first example of processing shown in FIGS. 22A to 22C and the second example of processing shown in FIGS. 23A to 23C are compared. As understood from FIG. 22C, since the picture B7' displayed at the beginning of the substituted commercial CM1' is shifted by one field from the picture B7 displayed at the beginning of the original commercial CM1, the display timing for the substituted commercial CM1' is delayed by one field. The delay of display by one field can scarcely be recognized by the human eyes. However, since the broadcasting station gains profits by broadcasting commercials of client companies, the broadcasting station might be required to broadcast the commercials accurately without having any delay, rather than broadcasting the main program such as the program 1. In the case where such accurate display time is required, the second example of processing shown in FIGS. 23A to 23C is effective. By rewriting the values of top_field_first and repeat_first_field of the picture B7' as in the second example of processing shown in FIGS. 23A to 23C, the first picture B7' of the substituted commercial CM1' can be displayed accurately without having any delay from the first displayed picture of the original commercial CM1.

In short, the locus of the data occupancy quantity in the VBV buffer of the stream $ST_{NEW}$ outputted from the stream processor 503 is consistent with the locus of the data occupancy quantity of the stream $ST_{OLD}$ in the VBV buffer, and has consistency with respect to the field pattern/frame pattern. Therefore, by controlling the switching operation of the splicing circuit 504 on the basis of a control signal from the splice controller 500, the spliced stream $ST_{SPL}$ is generated by connecting the stream $ST_{NEW}$ after the stream $ST_{OLD}$ at the splicing point SP1 and connecting the stream $ST_{OLD}$ after the stream $ST_{NEW}$ at the splicing point SP2. At the splicing points SP1 and SP2 in this spliced stream $ST_{SPL}$, the locus of the data occupancy quantity in the VBV buffer is continuous and the field pattern/frame pattern is also continuous.

The second embodiment of splicing processing will now be described. The second embodiment of splicing processing relates to splicing processing which is carried out in the case where a commercial CM1' to be newly inserted is coded to generate a coded stream $ST_{NEW}$ when a coded stream $ST_{OLD}$ of a transmission program is transmitted from the key station 30. That is, the coded stream $ST_{OLD}$ of the transmission program transmitted from the key station 30 is analyzed, and the commercial CM1' to be newly inserted is coded on the basis of the analysis result.

First, the coded stream $ST_{OLD}$ transmitted from the key station 30 is converted from the form of transport stream to the form of elementary stream by the stream conversion circuit 44. The coded stream $ST_{OLD}$ converted to the form of elementary stream is supplied to the stream analysis circuit 502 of the stream splicer 50.

The stream analysis circuit 502 of the stream splicer 50 is a circuit for analyzing the stream syntax of the coded stream $ST_{OLD}$. In the second embodiment of splicing processing, the stream analysis circuit 502 analyzes only the syntax of the coded stream $ST_{OLD}$ and does not analyze the syntax of the substitute stream $ST_{NEW}$.

Specifically, the stream analysis circuit 502 searches for 32-bit picture_start_code described in the original stream $ST_{OLD}$, thereby learning the place where information related to the picture header is described in the stream, as understood from the syntax of the coded stream shown in FIGS. 10 and 15. Then, the stream analysis circuit 502 finds 3-bit picture_coding_type, which starts 11 bits after picture_start_code, thereby learning the picture type. Also, the stream analysis circuit 502 learns vbv_delay of the coded picture from 16-bit vbv_delay described next to this 3-bit picture_coding_type.

In addition, the stream analysis circuit 502 searches for 32-bit extension_start_code described in the coded stream $ST_{OLD}$, thereby learning the place in the stream where information related to picture coding extension is described, as understood from the syntax of the coded stream shown in FIGS. 10 and 15. Then, the stream analysis circuit 502 searches for 1-bit top field first, which is described 25 bits after picture_start_code, and repeat_first_field, which is described 6 bits after that top_field_first, thereby learning the frame structure of the coded picture.

The stream analysis circuit 502 supplies the data elements such as picture_coding_type, vbv_delay, top_field_first, and repeat_first_field extracted for each picture from the original stream $ST_{OLD}$, to the broadcasting system controller 41 through the splice controller 500. It is not necessary to transmit the data elements of all the pictures of the original stream $ST_{OLD}$. It may suffice to send only the data elements such as picture_coding_type, vbv_delay, top_field_first, and repeat_first_field of the pictures corresponding to the commercial CM1 of the transmission program.

The broadcasting system controller 41 controls the CM server 47 to reproduce video data of the commercial CM1' to replace the commercial CM of the transmission program. In addition, the broadcasting system controller 41 supplies picture_coding_type, vbv_delay, top_field_first, and repeat_first_field extracted from the original stream $ST_{OLD}$ to the encoder controller 480 of the encoder block 48.

The encoder controller 480 controls the encoder 481 to encoder the base band video data of the substitute commercial CM1' by using picture_coding_type, vbv_delay, top_field_first and repeat_first_field supplied from the broadcasting system controller 41. That is, the substitute commercial CM1' is coded so that picture_coding_type, vbv_delay, top_field_first and repeat_first_field of the coded stream $ST_{OLD}$ of the original commercial CM1 and picture_coding_type, vbv_delay, top_field_first and repeat_first_field of the stream $ST_{NEW}$ obtained by coding the substitute commercial CM1' become perfectly identical to each other. As a result, the coded stream $ST_{NEW}$ having picture_coding_type, vbv_delay, top_field_first and repeat_first_field which are perfectly identical to picture_coding_type, vbv_delay, top_field_first and repeat_first_field of the coded stream $ST_{OLD}$ of the original commercial CM1 is generated.

The splice controller 500 switches the input terminal of the switch circuit 501 to "b" so as to supply the elementary stream $ST_{NEW}$ outputted from the encoder 481 to the stream analysis circuit 502. In this second embodiment of splicing processing, since the stream analysis circuit 502 analyzes only the syntax of the coded stream $ST_{OLD}$ and does not analyze the syntax of the substitute stream $ST_{NEW}$, the stream $ST_{NEW}$ is outputted as it is without being analyzed by the stream analysis circuit 502.

In the second embodiment of splicing processing, since stream processing for changing the data elements in the stream $ST_{OLD}$ and the stream $ST_{NEW}$ outputted from the stream analysis circuit 502 is not necessary, the stream processor 503 carries out only synchronization processing (or frame synchronization) for realizing frame synchronization between the stream $ST_{OLD}$ and the stream $ST_{NEW}$. Specifically, the stream processor 503 has a FIFO buffer for several frames, and buffers the stream $ST_{OLD}$ in the FIFO buffer until the substitute stream $ST_{NEW}$ is outputted from the encoder 481. Thus, frame synchronization between the stream $ST_{OLD}$ and the stream $ST_{NEW}$ can be realized. The stream $ST_{OLD}$ and the stream $ST_{NEW}$ processed for frame synchronization are supplied to the splicing circuit 504.

The splice controller 500 controls switching of the splicing circuit 504 so that the stream $ST_{NEW}$ is connected after the stream $ST_{OLD}$ at the splicing point SP1 and so that the stream $ST_{OLD}$ is connected after the stream $ST_{NEW}$ at the splicing point SP2. As a result, a spliced stream $ST_{SPL}$ is outputted from the splicing circuit 504.

Although the stream $ST_{OLD}$ and the stream $ST_{NEW}$ are simply switched by the splicing circuit 504, the locus of the data occupancy quantity of the spliced stream $ST_{SPL}$ in the VBV buffer is continuous and the frame pattern at the splicing points is also continuous. The reason therefor is as follows. That is, since the stream $ST_{NEW}$ is coded on the basis of the analysis result of the syntax of the original stream $ST_{OLD}$, the stream $ST_{NEW}$ consistent with the original stream $ST_{OLD}$ is generated. Therefore, the locus of the spliced stream $ST_{SPL}$ in the VBV buffer is perfectly the same as the locus of the data occupancy quantity of the original stream $ST_{OLD}$ in the VBV buffer, and the frame structure of the generated spliced stream $ST_{SPL}$ is perfectly identical to the frame structure of the original stream $ST_{OLD}$.

Thus, in the second embodiment, the syntax of the original coded stream $ST_{OLD}$ transmitted from the key station is analyzed, and the substitute commercial CM1' is coded in accordance with the analysis result so as to have the same stream structure and coding parameter as those of the coded stream $ST_{OLD}$. Therefore, in splicing the coded stream $ST_{OLD}$ and coded stream $ST_{NEW}$ which are separately generated, the consistency between the coded stream $ST_{OLD}$ and the coded stream $ST_{NEW}$ can be easily realized. As a result, the seamless spliced stream $ST_{SPL}$ in conformity to the MPEG standard can be generated.

The third embodiment of splicing processing will now be described. In the third embodiment of splicing processing, coding parameters for coding a coded stream $ST_{OLD}$ of an original commercial CM1 and a coded stream $ST_{NEW}$ of a substitute commercial CM1' are determined in advance before the coded stream $ST_{OLD}$ of the original commercial CM1 and the coded stream $ST_{NEW}$ of the substitute commercial CM1' are generated, and the original commercial CM1 and the substitute commercial CM1' are coded on the basis of the predetermined coding parameters. For example, the coding parameters are information indicated by picture_coding_type, vbv_delay, top_field_first, repeat_first_field, and the quantity of generated bits, as described already.

First, as the coding parameters for coding the original commercial CM1, picture_coding_type, vbv_delay, top_field_first and repeat_first_field are determined at the key station 30. The broadcasting system controller 31 of the key station 30 supplies the coding parameters to the encoder controller 350 of the MPEG encoder block 35, and also supplies the coding parameters to the broadcasting system controller 41 of each local station 40 through a communication line.

The encoder controller 350 controls the video encoder 351-1V to encode video data of the original commercial CM1 by using the coding parameters such as picture_coding_type, vbv_delay, top_field_first and repeat_first_field supplied from the broadcasting system controller 31. That is, the coded stream $ST_{OLD}$ outputted from the video encoder 351-1V is a stream based on the coding parameters such as picture_coding_type, vbv_delay, top_field_first and repeat_first_field.

The coded stream $ST_{OLD}$ outputted from the video encoder 351-1V is supplied to the local station 40 through the multiplexer 36 and the modulation circuit 37.

On the other hand, the local station 40 supplies the coding parameters such as picture_coding_type, vbv_delay, top_field_first and repeat_first_field supplied from the broadcasting system controller 31 of the key station 30 to the encoder controller 480 of the encoder block 48.

The encoder controller 480 controls the encoder 481 to encoder the base band video data of the substitute commercial CM1' by using picture_coding-type, vbv_delay, top_field_first and repeat_first_field supplied from the broadcasting system controller 41. That is, the stream $ST_{NEW}$ having picture_coding_type, vbv_delay, top_field_first and repeat_first_field perfectly identical to picture_coding_type, vbv_delay, top_field_first and repeat_first_field of the coded stream $ST_{OLD}$ of the original commercial CM1 is generated.

The splice controller 500 switches the input terminal of the switch circuit 501 to "b" so as to supply the elementary stream $ST_{NEW}$ outputted from the encoder 481 to the stream analysis circuit 502. In this third embodiment of splicing processing, the stream analysis circuit 502 does not carry out analysis of the syntax of the coded stream $ST_{OLD}$ and the coded stream $ST_{NEW}$.

In the third embodiment of splicing processing, since stream processing for changing the data elements in the stream $ST_{OLD}$ and the stream $ST_{NEW}$ outputted from the stream analysis circuit 502 is not necessary, the stream processor 503 carries out only synchronization processing (or frame synchronization) for realizing frame synchronization between the stream $ST_{OLD}$ and the stream $ST_{NEW}$. Specifically, the stream processor 503 has a FIFO buffer for several frames, and buffers the stream $ST_{OLD}$ in the FIFO buffer until the substitute stream $ST_{NEW}$ is outputted from the encoder 481. Thus, frame synchronization between the stream $ST_{OLD}$ and the stream $ST_{NEW}$ can be realized. The stream $ST_{OLD}$ and the stream $ST_{NEW}$ processed for frame synchronization are supplied to the splicing circuit 504.

The splice controller 500 controls switching of the splicing circuit 504 so that the stream $ST_{NEW}$ is connected after the stream $ST_{OLD}$ at the splicing point SP1 and so that the stream $ST_{OLD}$ is connected after the stream $ST_{NEW}$ at the splicing point SP2. As a result, a spliced stream $ST_{SPL}$ is outputted from the splicing circuit 504.

Although the stream $ST_{OLD}$ and the stream $ST_{NEW}$ are simply switched by the splicing circuit 504, the locus of the data occupancy quantity of the spliced stream $ST_{SPL}$ in the VBV buffer is continuous and the frame pattern at the splicing points is also continuous. This is because the original commercial CM1 and the substitute commercial CM1' are coded by using the coding parameters such as picture_coding_type, vbv_delay, top_field_first and repeat_first_field determined in advance by the broadcasting system controller 31 of the key station 30.

Thus, in the third embodiment, the coding parameters are predetermined between the key station and the local station. Then, the coded stream $ST_{OLD}$ of the original commercial CM1 is generated at the key station on the basis of the predetermined coding parameters, and the coded stream $ST_{NEW}$ of the substitute commercial CM1' is generated at the key station on the basis of the predetermined coding parameters. Therefore, in splicing the coded stream $ST_{OLD}$ and coded stream $ST_{NEW}$ which are separately generated, the consistency between the coded stream $ST_{OLD}$ and the coded stream $ST_{NEW}$ can be easily realized. As a result, the seamless spliced stream $ST_{SPL}$ in conformity to the MPEG standard can be generated.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein as well as all equivalents thereto.

What is claimed is:

1. A coded stream splicing device for splicing a first coded stream and a second coded stream at a splicing point, the device comprising:
   stream analysis means for analyzing the syntax of the first coded stream and identifying a coding parameter of the first coded stream; and
   splicing means for changing a coding parameter of the second coded stream on the basis of the coding parameter of the first coded stream identified by the stream analysis means so that the first coded stream and the second coded stream can be seamlessly connected at the splicing point, and for splicing the first coded stream and the second coded stream having the changed coding parameter;
   wherein the first coded stream is generated according to a first program editing table stored in a first broadcasting system controller, the second coded stream is generated according to a second program editing table stored in a second broadcasting system controller, and the splicing point is determined by the second broadcasting system controller according to the second program editing table.

2. The coded stream splicing device as claimed in claim 1, wherein the coding parameter identified by the stream analysis means is data indicating an initial state of a VBV buffer.

3. The coded stream splicing device as claimed in claim 2, wherein the splicing means rewrites the value of the identified parameter of the first picture after the splicing point in the second coded stream to the value of the identified parameter of the first picture after the splicing point in the first coded stream.

4. The coded stream splicing device as claimed in claim 3, wherein the splicing means inserts one or more stuffing bytes into the second coded stream so that the quantity of generated bits of the first picture after the splicing point in the second coded stream becomes equal to the quantity of bits corresponding to the rewritten value of the identified parameter.

5. The coded stream splicing device as claimed in claim 4, wherein the splicing means calculates the data quantity of the stuffing byte(s) on the basis of the quantity of generated bits of the first picture after the splicing point in the first coded stream and the quantity of generated bits of the first picture after the splicing point in the second coded stream.

6. The coded stream splicing device as claimed in claim 5, wherein the splicing means calculates the data quantity of the stuffing byte(s) on the basis of the data occupancy quantity of the VBV buffer at the splicing point of the first coded stream and the data occupancy quantity of the VBV buffer at the splicing point of the second coding stream.

7. The coded stream splicing device as claimed in claim 1, wherein the coding parameter identified by the stream analysis means is a flag indicating whether or not a repeat field is to be generated at the time of decoding.

8. The coded stream splicing device as claimed in claim 7, wherein the splicing means changes the value of the flag of a picture before the splicing point in the first coded stream or the value of the flag of a picture before the splicing point in the second coded stream so that the frame structure of the picture before the splicing point in the first coded stream and the frame structure of the picture before the splicing point in the second coded stream become consistent with each other.

9. The coded stream splicing device as claimed in claim 1, wherein the coding parameter identified by the stream analysis means is a flag indicating whether the first field is a top field or a bottom field.

10. The coded stream splicing device as claimed in claim 9, wherein the splicing means changes the value of the flag of a picture before the splicing point in the first coded stream or the value of the flag of a picture before the splicing point in the second coded stream so that the frame structure of the picture before the splicing point in the first coded stream and the frame structure of the picture before the splicing point in the second coded stream become consistent with each other.

11. A coded stream splicing method for splicing a first coded stream and a second coded stream at a splicing point, comprising the steps of:

analyzing the syntax of the first coded stream and identifying a coding parameter of the first coded stream; and changing a coding parameter of the second coded stream on the basis of the identified coding parameter of the first coded stream so that the first coded stream and the second coded stream can be seamlessly connected at the splicing point, and then splicing the first coded stream and the second coded stream having the changed coding parameter;

wherein the first coded stream is generated according to a first program editing table stored in a first broadcasting system controller, the second coded stream is generated according to a second program editing table stored in a second broadcasting system controller, and the splicing point is determined by the second broadcasting system controller according to the second program editing table.

12. The coded stream splicing method as claimed in claim 11, wherein the coding parameter identified at the analyzing step is data indicating an initial state of a VBV buffer.

13. The coded stream splicing method as claimed in claim 12, wherein at the changing and splicing step, the value of the identified parameter of the first picture after the splicing point in the second coded stream is rewritten to the value of the identified parameter of the first picture after the splicing point in the first coded stream.

14. The coded stream splicing method as claimed in claim 13, wherein the changing and splicing step includes inserting one or more stuffing bytes into the second coded stream so that the quantity of generated bits of the first picture after the splicing point in the second coded stream becomes equal to the quantity of bits corresponding to the rewritten value of the identified parameter.

15. The coded stream splicing method as claimed in claim 14, wherein at the changing and splicing step, the data quantity of the stuffing byte(s) is calculated on the basis of the quantity of generated bits of the first picture after the splicing point in the first coded stream and the quantity of generated bits of the first picture after the splicing point in the second coded stream.

16. The coded stream splicing method as claimed in claim 15, wherein at the changing and splicing step, the data quantity of the stuffing byte(s) is calculated on the basis of the data occupancy quantity of the VBV buffer at the splicing point of the first coded stream and the data occupancy quantity of the VBV buffer at the splicing point of the second coding stream.

17. The coded stream splicing method as claimed in claim 11, wherein the coding parameter identified at the analyzing step is a flag indicating whether or not a repeat field is to be generated at the time of decoding.

18. The coded stream splicing method as claimed in claim 17, wherein at the changing and splicing step, the value of the flag of a picture before the splicing point in the first coded stream or the value of the flag of a picture before the splicing point in the second coded stream is changed so that the frame structure of the picture before the splicing point in the first coded stream and the frame structure of the picture before the splicing point in the second coded stream become consistent with each other.

19. The coded stream splicing method as claimed in claim 11, wherein the coding parameter identified at the analyzing step is a flag indicating whether the first field is a top field or a bottom field.

20. The coded stream splicing method as claimed in claim 19, wherein at the splicing step, the value of the flag of a picture before the splicing point in the first coded stream or the value of the flag of a picture before the splicing point in the second coded stream is changed so that the frame structure of the picture before the splicing point in the first coded stream and the frame structure of the picture before the splicing point in the second coded stream become consistent with each other.

21. A coded stream generating device for generating a spliced coded stream by splicing a first coded stream and a second coded stream at a splicing point, the device comprising:

stream analysis means for analyzing the syntax of the first coded stream and identifying a coding parameter of the first coded stream; and splicing means for changing a coding parameter of the second coded stream on the basis of the coding parameter of the first coded stream identified by the stream analysis means so that the first coded stream and the second coded stream can be seamlessly connected at the splicing point, and for splicing the first coded stream and the second coded stream having the changed coding parameter;

wherein the first coded stream is generated according to a first program editing table stored in a first broadcasting system controller, the second coded stream is generated according to a second program editing table stored in a second broadcasting system controller, and the splicing point is determined by the second broadcasting system controller according to the second program editing table.

22. A coded stream generating method for generating a spliced coded stream by splicing a first coded stream and a second coded stream at a splicing point, comprising the steps of:

analyzing the syntax of the first coded stream and identifying a coding parameter of the first coded stream; and changing a coding parameter of the second coded stream on the basis of the coding parameter of the first coded stream identified at the analyzing step so that the first coded stream and the second coded stream can be seamlessly connected at the splicing point, and then splicing the first coded stream and the second coded stream having the changed coding parameter;

wherein the first coded stream is generated according to a first program editing table stored in a first broadcasting system controller, the second coded stream is generated according to a second program editing table stored in a second broadcasting system controller, and the splicing point is determined by the second broadcasting system controller according to the second program editing table.

23. A stream splicing apparatus for splicing a first encoded stream and a second encoded stream at a splicing point to generate a spliced stream, the apparatus comprising:

parsing means for parsing a syntax of said first encoded stream and said second encoded stream to extract one or more coding parameters from said first encoded stream and said second encoded stream, wherein said coding parameters indicate frame structures of said first encoded stream and said second encoded stream;

stream processing means for controlling said coding parameters of first encoded stream and/or said second encoded stream so that the frame structure of said spliced stream will not be discontinuous;

splicing means for splicing said first encoded stream supplied from said stream processing means and said second encoded stream supplied from said stream processing means.

24. A stream splicing apparatus for splicing encoded streams to generate a spliced stream, the apparatus comprising:

first encoding means for encoding a first source video program to generate a first encoded stream;

parsing means for parsing a syntax of said first encoded stream to extract one or more coding parameters from said first encoded stream;

second encoding means for encoding a second source video program to generate a second encoded stream, wherein said second source video program is encoded based on said extracted coding parameter(s) such that said first encoded stream and said second encoded stream can be seamlessly connected at a splicing point;

splicing means for splicing said first encoded stream and said second encoded stream;

wherein the first encoded stream is generated according to a first program editing table stored in a first broadcasting system controller, the second encoded stream is generated according to a second program editing table stored in a second broadcasting system controller, and the splicing point is determined by the second broadcasting system controller according to the second program editing table.

25. A stream splicing apparatus for splicing encoded streams to generate a spliced stream, the apparatus comprising:

defining means for defining coding parameters;

first encoding means for encoding a first source video program to generate a first encoded stream based on said coding parameters;

second encoding means for encoding a second source video program to generate a second encoded stream, wherein said second source video program is encoded based on said encoding parameter(s) such that said first encoded stream and said second encoded stream can be seamlessly connected at a splicing point;

splicing means for splicing said first encoded stream and said second encoded stream;

wherein the first encoded stream is generated according to a first program editing table stored in a first broadcasting system controller, the second encoded stream is generated according to a second program editing table stored in a second broadcasting system controller, and the splicing point is determined by the second broadcasting system controller according to the second program editing table.

26. A coded stream splicing device for splicing a first coded stream and a second coded stream at a splicing point, the device comprising:

stream analysis means for analyzing the syntax of the first coded stream and identifying a coding parameter of the first coded stream; and splicing means for changing a coding parameter of the second coded stream on the basis of the coding parameter of the first coded stream identified by the stream analysis means so that the first coded stream and the second coded stream can be seamlessly connected at the splicing point, and for splicing the first coded stream and the second coded stream having the changed coding parameter;

whereby the splicing of the first coded stream and the second coded stream is performed according to a top-field-first indicator, said top-field-first indicator indicating whether or not a top field temporally precedes a bottom field in a frame structure.

27. A coded stream splicing method for splicing a first coded stream and a second coded stream at a splicing point, comprising the steps of:

analyzing the syntax of the first coded stream and identifying a coding parameter of the first coded stream; and changing a coding parameter of the second coded stream on the basis of the identified coding parameter of the first coded stream so that the first coded stream and the second coded stream can be seamlessly connected at the splicing point, and then splicing the first coded stream and the second coded stream having the changed coding parameter;

whereby the splicing of the first coded stream and the second coded stream is performed according to a top-field-first indicator, said top-field-first indicator indicating whether or not a top field temporally precedes a bottom field in a frame structure.

28. A coded stream generating device for generating a spliced coded stream by splicing a first coded stream and a second coded stream at a splicing point, the device comprising:

stream analysis means for analyzing the syntax of the first coded stream and identifying a coding parameter of the first coded stream; and splicing means for changing a coding parameter of the second coded stream on the basis of the coding parameter of the first coded stream identified by the stream analysis means so that the first coded stream and the second coded stream can be seamlessly connected at the splicing point, and for splicing the first coded stream and the second coded stream having the changed coding parameter;

whereby the splicing of the first coded stream and the second coded stream is performed according to a top-field-first indicator, said top-field-first indicator indicating whether or not a top field temporally precedes a bottom field in a frame structure.

29. A coded stream generating method for generating a spliced coded stream by splicing a first coded stream and a second coded stream at a splicing point, comprising the steps of:

analyzing the syntax of the first coded stream and identifying a coding parameter of the first coded stream; and changing a coding parameter of the second coded stream on the basis of the coding parameter of the first coded stream identified at the analyzing step so that the first coded stream and the second coded stream can be seamlessly connected at the splicing point, and then splicing the first coded stream and the second coded stream having the changed coding parameter;

whereby the splicing of the first coded stream and the second coded stream is performed according to a top-field-first indicator, said top-field-first indicator indicating whether or not a top field temporally precedes a bottom field in a frame structure.

30. A stream splicing apparatus for splicing a first encoded stream and a second encoded stream at a splicing point to generate a spliced stream, the apparatus comprising:

parsing means for parsing a syntax of said first encoded stream and said second encoded stream to extract one or more coding parameters from said first encoded stream and said second encoded stream, wherein said coding parameters indicate frame structures of said first encoded stream and said second encoded stream;

stream processing means for controlling said coding parameters of first encoded stream and/or said second encoded stream so that the frame structure of said spliced stream will not be discontinuous;

splicing means for splicing said first encoded stream supplied from said stream processing means and said second encoded stream supplied from said stream processing means;

whereby the splicing of the first encoded stream and the second encoded stream is performed according to a top-field-first indicator, said top-field-first indicator indicating whether or not a top field temporally precedes a bottom field in a frame structure.

31. A stream splicing apparatus for splicing encoded streams to generate a spliced stream, the apparatus comprising:

first encoding means for encoding a first source video program to generate a first encoded stream;

parsing means for parsing a syntax of said first encoded stream to extract one or more coding parameters from said first encoded stream;

second encoding means for encoding a second source video program to generate a second encoded stream, wherein said second source video program is encoded based on said extracted coding parameter(s) such that said first encoded stream and said second encoded stream can be seamlessly connected at a splicing point; and splicing means for splicing said first encoded stream and said second encoded stream;

whereby the splicing of the first encoded stream and the second encoded stream is performed according to a top-field-first indicator, said top-field-first indicator indicating whether or not a top field temporally precedes a bottom field in a frame structure.

32. A stream splicing apparatus for splicing encoded streams to generate a spliced stream, the apparatus comprising:

defining means for defining coding parameters;

first encoding means for encoding a first source video program to generate a first encoded stream based on said coding parameters;

second encoding means for encoding a second source video program to generate a second encoded stream, wherein said second source video program is encoded based on said encoding parameter(s) such that said first encoded stream and said second encoded stream can be seamlessly connected at a splicing point; and splicing means for splicing said first encoded stream and said second encoded stream;

whereby the splicing of the first encoded stream and the second encoded stream is performed according to a top-field-first indicator, said top-field-first indicator indicating whether or not a top field temporally precedes a bottom field in a frame structure.

* * * * *